(12) United States Patent
Satoyama et al.

(10) Patent No.: US 8,327,094 B2
(45) Date of Patent: Dec. 4, 2012

(54) LOGICAL VOLUME TRANSFER METHOD AND STORAGE NETWORK SYSTEM

(75) Inventors: Ai Satoyama, Kanagawa (JP); Yoshiaki Eguchi, Kanagawa (JP); Yasutomo Yamamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 331 days.

(21) Appl. No.: 12/726,652

(22) Filed: Mar. 18, 2010

(65) Prior Publication Data
US 2010/0180077 A1     Jul. 15, 2010

Related U.S. Application Data

(63) Continuation of application No. 11/353,631, filed on Feb. 13, 2006, now Pat. No. 7,702,851.

(30) Foreign Application Priority Data

Sep. 20, 2005   (JP) ................................. 2005-271382
Dec. 25, 2005   (JP) ................................. 2005-372192

(51) Int. Cl.
G06F 12/00     (2006.01)
G06F 13/00     (2006.01)
G06F 13/28     (2006.01)

(52) U.S. Cl. ........................................ 711/161; 711/162
(58) Field of Classification Search ........................ None
See application file for complete search history.

(56) References Cited

U.S. PATENT DOCUMENTS

| | | | |
|---|---|---|---|
| 5,905,995 A | 5/1999 | Tabuchi et al. | |
| 7,111,138 B2 | 9/2006 | Higaki et al. | |
| 7,114,044 B2 | 9/2006 | Takahashi et al. | |
| 7,130,975 B2 | 10/2006 | Suishu et al. | |
| 7,263,593 B2 | 8/2007 | Honda et al. | |
| 7,302,535 B2 | 11/2007 | Satoyama et al. | |
| 7,451,164 B2 | 11/2008 | Arai et al. | |
| 2003/0229764 A1 * | 12/2003 | Ohno et al. | 711/147 |

(Continued)

FOREIGN PATENT DOCUMENTS

| | | |
|---|---|---|
| EP | 1093051 A2 | 4/2001 |
| JP | 07-210439 | 8/1995 |

(Continued)

OTHER PUBLICATIONS

Japan Patent Office office action for patent application JP2005-372192 (Jun. 14, 2011).

*Primary Examiner* — Yaima Campos
(74) *Attorney, Agent, or Firm* — Kilpatrick Townsend & Stockton LLP

(57) ABSTRACT

The present invention transfers replication logical volumes between and among storage control units in a storage system comprising a plurality of storage control units. To transfer replication logical volumes from a storage control unit to a storage control unit, a virtualization device sets a path to the storage control unit. The storage control unit then prepares a differential bitmap in order to receive access requests. When the preparation is completed, the virtualization device makes access requests to the storage control unit. The storage control unit then hands over the access requests to the storage control unit. Subsequently, the storage control unit performs a process so that the access requests are reflected in a disk device and performs an emergency destage of storing data in a cache memory into disk device. When the emergency destage is ended, the storage control unit connects to an external storage control unit and hands over access requests to the external storage control unit.

7 Claims, 22 Drawing Sheets

U.S. PATENT DOCUMENTS

| | | |
|---|---|---|
| 2004/0003173 A1* | 1/2004 | Yao et al. .................. 711/114 |
| 2004/0103261 A1* | 5/2004 | Honda et al. ............... 711/202 |
| 2004/0143832 A1 | 7/2004 | Yamamoto et al. |
| 2005/0125465 A1 | 6/2005 | Arakawa et al. |
| 2005/0125609 A1 | 6/2005 | Satoyama et al. |
| 2005/0204104 A1 | 9/2005 | Aoshima et al. |
| 2006/0271758 A1 | 11/2006 | Innan et al. |

FOREIGN PATENT DOCUMENTS

| | | |
|---|---|---|
| JP | 2001-318833 | 11/2001 |
| JP | 2003-008821 | 1/2003 |
| JP | 2004-220450 | 8/2004 |
| JP | 2004-227558 A | 8/2004 |
| JP | 2005-078453 A | 3/2005 |

* cited by examiner

FIG.5

Vt1 Same-device correspondence table

| Path No. | Storage control unit identifier | LU No. | Same-device correspondence identifier |
|---|---|---|---|
| 0 | H type A | 10 | a |
| 1 | H type A | 11 | b |
| 2 | H type A | 10 | a |
| 3 | H type B | 9 | a |
| | ... | | |

FIG.6A

Ct1A(Ct1) Volume pair information management table

| Pair No. | Primary volume information | Secondary volume information | Pairing status | Formation copy bit | Secondary access disabling bit | Transfer information ||||
|---|---|---|---|---|---|---|---|---|---|
| | | | | | | Transfer source ||  Transfer destination ||
| | | | | | | Storage control unit No. | Pair No. | Storage control unit No. | Pair No. |
| 0 | 100 | 10 | Pair | | | | | | |
| 2 | 120 | 30 | Split | | | | | | |
| 4 | 140 | 69 | Split | | | | | | |

FIG.6B

Ct1B(Ct1) Volume pair information management table

| Pair No. | Primary volume information || Secondary volume information || Pairing status | Formation copy bit | Secondary access disabling bit | Transfer information ||||
|---|---|---|---|---|---|---|---|---|---|---|
| | Storage control unit No. | Volume No. | Storage control unit No. | Volume No. | | | | Transfer source || Transfer destination ||
| | | | | | | | | Storage control unit No. | Pair No. | Storage control unit No. | Pair No. |
| 1 | 1 | 110 | 2 | 120 | Pair | | | | | | |
| 3 | 1 | 130 | 3 | 260 | Pair | | | | | | |

FIG.7

Ct2 Volume information table

| Volume No. | Primary/secondary flag | Counterpart volume information | | Volume usage flag | External storage control unit volume usage flag |
|---|---|---|---|---|---|
| | | Storage control unit No. | Volume No. | | |
| 0 | Primary | 1 | 20 | In use | – |
| 0 | Primary | – | 158 | In use | – |
| 0 | Primary | 1 | 426 | In use | – |
| 1 | Secondary | 3 | 3783 | In use | In use |
| | | | | | |

FIG.20

Gt1 Group Information Table

| Group Number | Storage Control Unit Number | Pair Number |
|---|---|---|
| 0 | 20A | 0, 1, 2, 3, 4, 5, 6 |
| | 20B | 6, 7, 8, 9 |
| 1 | 20C | 11, 12 |
| 2 | 20C | 20, 22, 27 |
| ... | ... | ... |

At1s Address Mapping Table (for Secondary Volume)

| Volume Address | Actual Data Storage Address |
|---|---|
| 0 | 10011 |
| 1 | P-VOL |
| ... | ... |

LOGICAL VOLUME TRANSFER METHOD AND STORAGE NETWORK SYSTEM

CLAIM OF PRIORITY

The present application is a continuation application of U.S. patent application Ser. No. 11/353,631, filed Feb. 13, 2006, which application claims priority from Japanese application JP 2005-271382 filed on Sep. 20,2005, the content of both of which are hereby incorporated by reference into this application.

BACKGROUND OF THE INVENTION

1. Field of the Invention

This invention relates to a storage control unit having a plurality of control devices connected to a plurality of disk devices, and method of transferring replication logical volumes thereof.

2. Description of the Prior Art

As a virtualization art concerning logical volumes of a storage control unit, there is an art of managing logical units (LU) of an external storage control unit, which is of a different frame from the unit, inside the storage control unit. See, for example, Japanese Patent Application Laid-Open (Kokai) Nos. H7-210439, 2001-318833 and 2003-008821. There are also arts for creating replications of logical volumes inside a storage control unit.

In recent years, a concept called "storage grid," with which a plurality of distributed computing resources are put into operation as a single entity, is becoming noted in the storage industry. As one form thereof, a configuration may be considered wherein a plurality of storage control units are arranged together and deemed to be a single system. Presently, the data in replication logical volumes (including relevant volumes, such as those of the same attribute, etc.) in a storage control unit cannot be transferred with the relevance being maintained to other storage control units in accompaniment with an increase or decrease of the number of storage control units or for the purpose of load distribution between and among storage control units. Furthermore, in cases where the abovementioned storage control units are connected to an external storage control unit, logical volume transfer processes between and among storage control units cannot be performed likewise for replication logical volumes that are entities in the external storage control unit.

This invention has been made in view of the above issues and aims to provide in a storage system comprising a plurality of storage control units, a means for transferring replication logical volumes (including those with which the logical volume entities exist in an external storage control unit) between and among storage control units.

SUMMARY OF THE INVENTION

In order to achieve the above object, this invention provides a logical volume transfer method, whereby, in a system comprising: a storage system, having logical volumes, logically managed by a plurality of storage control units, as entities in the respective storage control units or in an external storage control unit connected to the storage control units; and a virtualization device, identifying the plurality of storage control units as a single storage control unit; the logical volumes are transferred between and among the storage control units, wherein in transferring the logical volumes among the storage control units, other logical volumes, forming a pair or a group of two or more pairs with the logical volumes, are transferred includingly.

The logical volume transfer method according to this invention is characterized in including, in case the logical volume comprise replication logical volumes, the entities of the replication logical volumes exist in the external storage control unit, and the primary logical volume and the secondary logical volume of the replication logical volumes are to be transferred from a first storage control unit with which a path to the virtualization device is already set, to a second storage control unit with which the path is not set, the steps of the virtualization device setting a path to the second storage control unit; the second storage control unit preparing differential bitmaps, indicating the data difference between the primary logical volume and the secondary logical volume, in order to receive access requests; the virtualization device, upon completion of the preparation of the differential bitmaps, making a setting so that access requests of the logical volumes are made not to the first storage control unit but to the second storage control unit; the second storage control unit handing over the access requests received from the virtualization device to the first storage control unit; the first storage control unit processing the access requests received from the second storage control unit so as to reflect the access requests in a disk device; the first storage control unit performing an emergency destage for storing the data in a cache memory of the logical volumes into the disk device; and the second storage control unit, upon completion of the emergency destage, connecting to the external storage control unit and handing over access requests received from the virtualization device to the external storage control unit in stead of the first storage control unit, It is to be noted that a "virtualization device" in the claims corresponds to a "virtualization program or virtualization device 52 in a host 51" as discussed in description of the preferred embodiments. This invention also includes logical volume transfer methods and a storage network system other than those described herein.

The present invention has an effect of allowing transferring replication logical volumes between and among storage control units, in a storage system comprising a plurality of storage control units. The replication logical volumes include those with which the logical volume entities exist in an external storage control unit.

BRIEF DESCRIPTION OF THE DRAWINGS

FIG. 5 is a diagram showing an example of a same-device correspondence table;

FIG. 6A is a diagram showing an exemplary volume pair information management table for creating a replication in the same storage control unit;

FIG. 6B is a diagram showing an exemplary volume pair information management table for creating a replication across different storage control units;

FIG. 7 is a diagram showing an example of a volume information table;

FIG. 20 is a diagram showing an example of a group information table.

DESCRIPTION OF THE PREFERRED EMBODIMENTS

Figure 1:
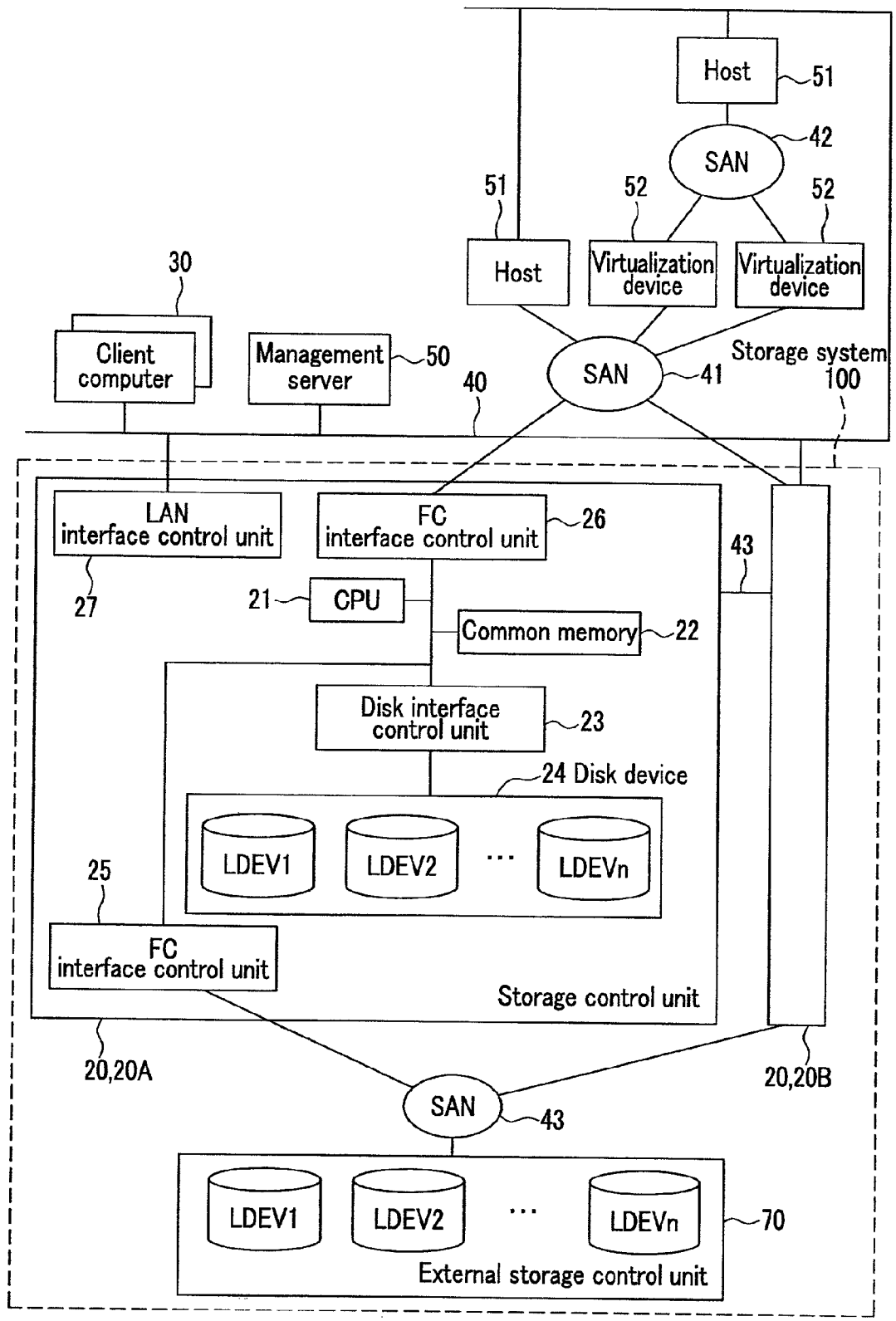
FIG. 1 is a diagram showing the general configuration of a storage system of an embodiment of this invention.

Preferred embodiments of the invention will now be described in detail with reference to the drawings.

<<System Configuration and Outline>>

First, referring to FIG. 1, the general configuration of a storage system of an embodiment of this invention will be described.

A storage system 100 has a plurality of storage control units 20 (20A and 20B) and an external storage control unit 70. A management server 50 is connected to storage control units 20 via a network 40. To the storage control units 20, hosts 51 are connected via SANs (Storage Area Networks) 41 and 42 and virtualization devices 52. Here, the virtualization devices 52 and virtualization programs (not shown) in the hosts 51 recognize the plurality of storage control units as a single storage control unit, thereby allowing an external host 51 (host program) to access a logically single storage control unit provided by the storage system 100. To the storage system 100, a client computer 30 is connected directly or via the LAN 40. Specifically, the client computer 30 directly connects to the storage system 100 and makes a request thereto. Alternatively, the client computer 30 connects to the host 51 via the LAN 40 and makes a request to the storage system 100 through an application in the host 51. The system including the storage system 100 and the virtualization devices 52 is referred to as a storage network system.

Each of the storage control units 20 has a CPU (Central Processing Unit) 21, a common memory 22, a disk interface control unit 23, a plurality of disk devices 24, FC (Fiber Channel) interface control units 25 and 26, and a LAN (Local Area Network) interface control unit 27. By executing various programs and modules stored in the common memory 22, CPU 21 realizes various control processes in the storage control unit 20. The common memory 22 is known as an internal storage control unit and includes both a non-volatile memory that stores various modules, and a volatile memory that temporarily stores computation process results.

The CPU 21 is connected to the disk devices 24 via the disk interface control unit 23. The disk interface control unit 23 converts logical addresses sent from the CPU 21 to logical block addresses to realize access by the CPU 21 to various logical devices.

Each of the disk devices 24 is a disk array device formed of a RAID (Redundant Array of Inexpensive Disks) configuration of one or more magnetic hard disk drives and provides a single or a plurality of storage logical volume areas, that is, logical devices (LDEVs) by means of a plurality of hard disk drives, or provides one or a plurality of logical devices by means of a single hard disk drive. Access to each logical device (also referred to as "logical unit") is executed using a logical unit No. (LUN) and a logical block address (LBA). This invention's embodiment may be arranged without the disk devices 24 and the disk interface control unit 23, on the condition that the external storage control unit 70, to be described later, is connected.

The FC interface control unit 25 is connected, for example, to an optical fiber cable or copper wire, and between the storage control unit 20 and the external storage control unit 70, sending and receiving of commands and data are executed via a SAN 43 and by a fiber channel protocol. At the SAN 43, a communication protocol, such as a fiber channel protocol or iSCSI, is used. The SAN 43 is not essential and each storage control unit 20 (FC interface control unit 25) and external storage control unit 70 may be connected directly with an optical fiber cable, for example.

The FC interface control unit 26 is connected to the host 51 via the SAN 41 with an optical fiber cable. The host 51 executes application programs for, for example, a database management system (DBMS), writes processing results to the storage control unit 20, and utilizes information resources stored therein. At the SANs 41 and 42, a communication protocol, such as the fiber channel protocol or iSCSI, is used. There are also configurations wherein the FC interface control unit 26 is connected to the virtualization device 52 via the SAN 41 and the virtualization device 52 is connected to the host 51 via the SAN 42. In case the FC interface control unit 26 is connected via the SAN 41 to the host 51, a virtualization program in the virtualization device 52 is installed in the host 51. The virtualization device 52 may, for example, be a switch, intelligent switch, dedicated device. The virtualization device 52 may also be replaced by the host 51 having a virtualization program installed therein.

The management server 50 is a management computer that manages the storage system 100 and, for example, executes the creation of logical volumes in the storage control units 20, allocation of logical volumes to the hosts 51, zoning, and LUN masking setting. The management server 50 is connected via the LAN 40 to the LAN interface control unit 27 of the each storage control unit 20 and executes the sending and receiving of commands and data with respect to the storage control units 20 by means of a TCP/IP protocol, which is a communication protocol. The LAN 40 is a local area network that is structured by Ethernet (registered trademark), in which data transmission using the TCP/IP protocol is carried out. Communication between and among the storage control units 20 is carried out, for example, via the SAN 41.

The external storage control unit 70 is a different type of storage control unit from the storage control units 20. The external storage control unit 70 is connected to the storage control units 20 and is managed by the storage control units 20. The each storage control unit 20 allocates LUs to logical volumes inside the external storage control unit 70 and makes the LUs appear to the hosts 51 as virtually being the disk devices 24 inside the storage control unit 20. To read/write data from or to the external storage control unit 70, the hosts 51 issue read/write requests to LUs that are virtually allocated inside the storage control units 20. The storage control units 20 convert the received requests to read/write commands to the corresponding LUs in the external storage control unit 70 and send the commands to the external storage control unit 70. The external storage control unit 70 may be of the same model as the storage control units 20. By the above, the each storage control unit 20 is made to have logical volumes, which the unit logically manages on its own, as entities in the storage control unit 20 or in the external storage control unit 70.

Figure 2A:
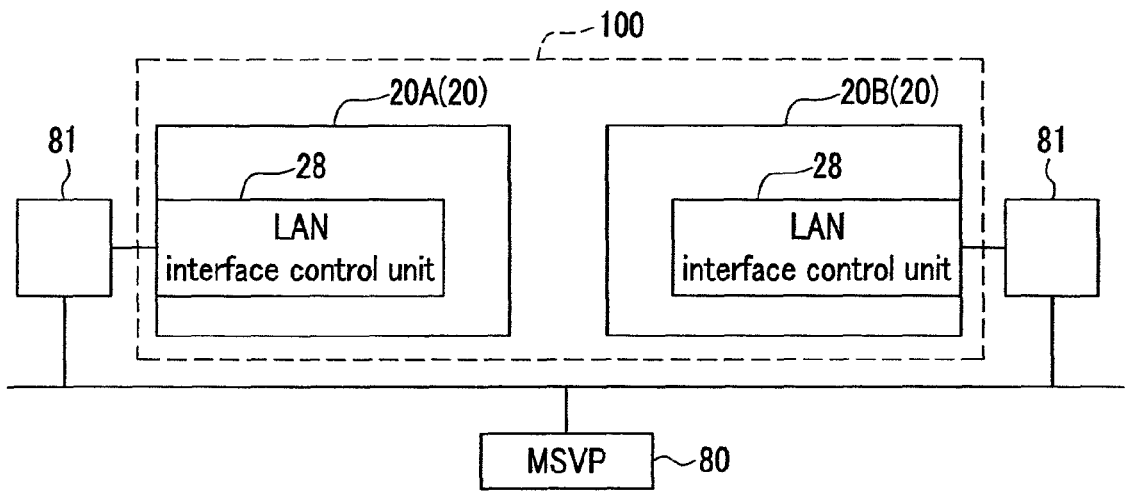
FIGS. 2A and 2B are diagrams each showing an "exemplary configuration of a service processor.
Figure 2B:
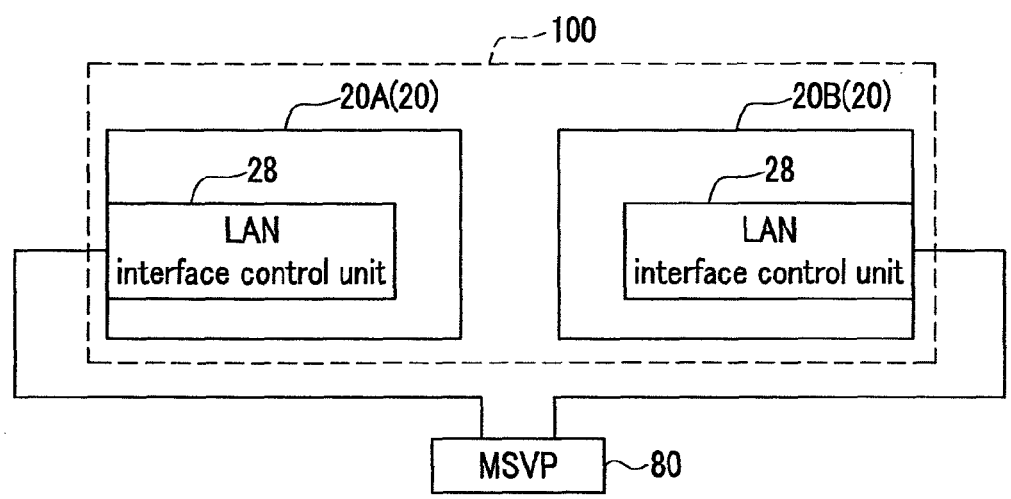

FIGS. 2A and 2B each shows a diagram of an exemplary configuration of service processors (SVPs). Service processors 81 carry out, for example, configuration setting and operating information acquisition of the respective storage control units 20 and are, for example, terminals of PCs (Personal Computers). The SVPs are connected to the respective storage control units 20 via the LAN 40, shown in FIG. 1. FIG. 2A shows a configuration example, in which the service processors 81 are installed for the respective storage control units 20 via LAN. The service processors 81 are connected to a master service processor (MSVP) 80 that brings together information acquired from the respective service processors 81. A user can thereby reference the information of the respective service processors 81 in a consolidated manner using the MSVP 80. One of the service processors 81 may be the MSVP. FIG. 2B shows an exemplary configuration wherein the respective storage control units 20 are directly connected to the master service processor 80.

Here, the storage system 100 acquires the configuration information from the storage control units 20 and indicates a range (that may include the external storage control unit 70) in which logical volume transfer processes between and among storage control units 20 are enabled.

<<Configuration of Programs and Tables>>

Figure 3:
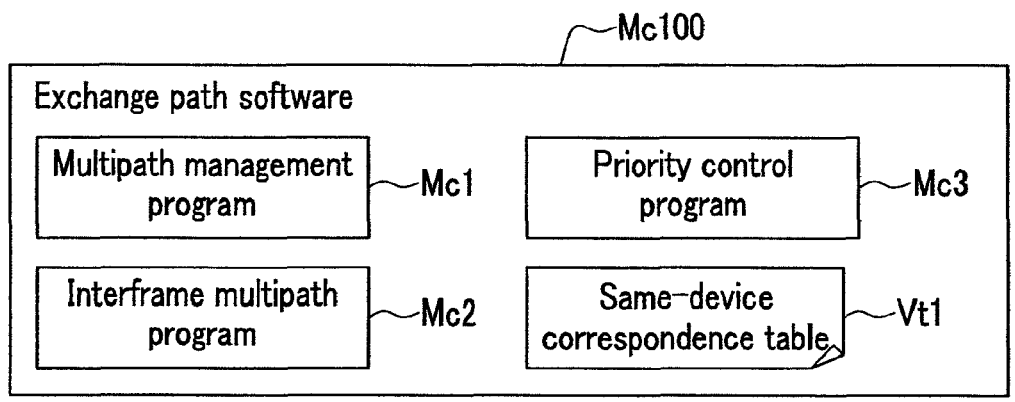
FIG. 3 is a diagram showing a configuration of an exchange path software.

FIG. 3 is a diagram showing a configuration of an exchange path software. When accessing a logical volume inside the storage system 100 from the host 51, an exchange path software Mc100 manages a plurality of paths to the logical volume and controls which path is to be used. The exchange path software Mc100 has a multipath management program Mc1, an interframe multipath program Mc2, a priority control program Mc3, and a same-device correspondence table Vt1. The multipath management program Mc1 manages and controls the entirety of the exchange path software Mc100. For logical volumes inside the external storage control unit 70, the interframe multipath program Mc2 recognizes paths spanning across a plurality of the storage control units 20 as multipaths. When the multipaths are set up between and among the different storage control units 20, the priority control program Mc3 sets a usage rate for each path and carries out control to use a portion of the paths with priority. The same-device correspondence table Vt1 indicates the correspondence of devices, which, though differing in path, are the same in entity.

The exchange path software Mc100 may be located inside the host 51 or inside the virtualization device 52.

Figure 4:
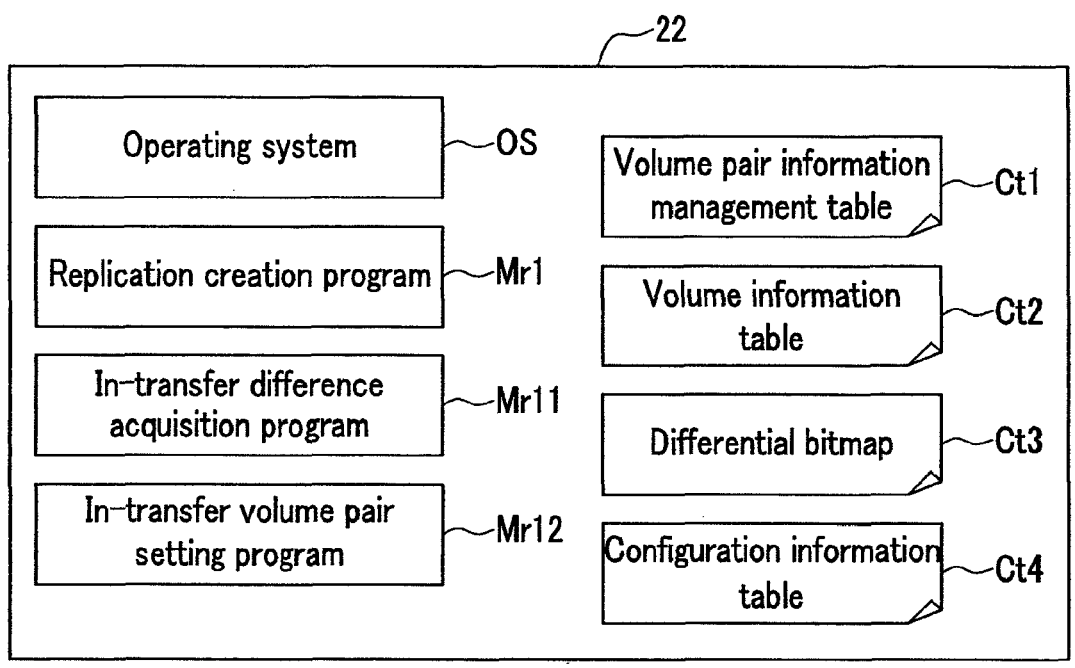
FIG. 4 is a diagram showing a memory configuration of a storage control unit.

FIG. 4 is a diagram showing a memory configuration of each storage control unit. Inside the common memory 22 are stored an operating system OS, a replication creation program Mr1, an in-transfer difference acquisition program Mr11, and an in-transfer logical volume pair setting program Mr12, which are executed by the CPU 21, as well as control information for the replication creation program Mr1 to create replications of logical volumes or data. In the common memory 22 are also stored a volume pair information management table Ct1, a volume information table Ct2, a differential bitmap Ct3, and a configuration information table Ct4. In the volume pair information management table Ct1 is recorded information concerning the copy sources and the copy destinations of data. In the volume information table Ct2 are recorded whether or not the respective logical volumes are creating replications. The differential bitmap Ct3 is used to perform a copy process for creating a replication, and indicates the difference of data between the primary logical volume and secondary logical volume. The configuration information table Ct4 is for external storage control unit 70 providing its own LUs to the storage control units 20 as LUs of the storage control unit 20. These programs and tables are provided inside the common memory 22 of the respective storage control units 20.

Though data replication may be carried out in a synchronous manner (whereby completion is reported to the host device (host 51) upon waiting for completion of the copying of data) or in an asynchronous manner (whereby completion is reported to the host device (host 51) without waiting for completion of the copying of data), these variations are not distinguished in particular in the description of this invention's embodiment.

FIG. 5 is a diagram showing an example of the same-device correspondence table Vt1, held by the virtualization device 52 and a virtualized layer (a program layer inside the host 51). The same-device to correspondence table Vt1 contains path No., storage control unit identifier, LU No., and same-device correspondence identifier. The same-device correspondence identifiers in FIG. 5 indicate that path Nos. 0, 2, and 3 can access the same device entity differing in frame. Even with the same device, path Nos. 0 and 2 differ from path No. 3 in LU No. since the paths pass different storage control units 20 (frames).

FIGS. 6A and 6B each shows an exemplary diagram of a volume pair information management table Ct1. The volume pair information management table Ct1 contains pair No., primary volume information, secondary volume information, pairing status, formation copy bit, secondary access disabling bit, and transfer information, which are information for managing logical volume pairs (hereinafter referred to as "pairs") that hold copied data in the storage control units 20. FIG. 6A shows an example of a table for carrying out replication creation within the same storage control unit. FIG. 6B shows an example of a table for carrying out replication creation among different storage control units.

In volume pair information management table Ct1A, shown in FIG. 6A, the pair No. is an identifier that is assigned arbitrarily to a pair.

The primary volume information indicates a logical volume No. assigned to the primary logical volume among the pair to which the identifier was assigned.

The secondary volume information indicates a logical volume No. assigned to the secondary logical volume among the pair to which the identifier was assigned. The pairing status indicates the current status of each pair. Examples of the pairing status include a status, wherein the data stored in the respective logical volumes of a pair are synchronized and the contents of the data stored in the respective logical volumes are matched (hereinafter referred to as the "pair status"), and a status, wherein data are not synchronized within a pair (hereinafter referred to as the "split status").

The storage control unit 20 changes the status of a pair, for example, from the pair status to the split status at an arbitrary time. In this case, the data held by the pair at the arbitrary time are saved in the secondary logical volume (such a process is referred to as "taking a snapshot"). Thereafter, by a host 51 reading the data from the secondary logical volume and writing the data into another storage control unit (such as a tape device), the data stored in the pair at the time at which the snapshot was taken can be backed up. Also, the secondary logical volume after the taking of the snapshot may be saved in itself as the backup of the data.

The formation copy bit is an identifier, which, when the corresponding pair is a pair in the process of transfer from another frame, prevents the starting of formation copy (copying of all data from the primary logical volume to the secondary logical volume) that is normally started at the same time as pair creation. The default value is "0" and with this value, formation copy is carried out at the same time as pair creation.

The secondary access disabling bit is used as follows. That is, in case the corresponding pair is a pair in the process of being transferred from another frame and data of the secondary logical volume of the pair are changed by a storage control unit 20B, which is the transfer destination, prior to the completion of transfer, and formation copy is performed thereafter, since the data will then be overwritten, the correct data may not remain. Thus in order to disable access to the secondary logical volume by the transfer destination storage control unit 20B during transfer, the secondary access disabling bit is set to an identifier value. The default value is "0" and access to the secondary logical volume is not disabled in the default state. However, in the pair status, access is enabled only when access to the secondary logical volume is enabled.

The transfer information is the storage control unit Nos. (frame Nos.) and pair Nos. of the transfer source and the transfer destination. When the transfer destination is determined, the storage control unit No. and the pair No. of the transfer destination are registered. When data is to be returned to the transfer source, the storage control unit No. and the pair No. of the transfer source are referred.

Though volume pair information management table Ct1B, shown in FIG. 6B, is basically the same as the table shown in FIG. 6A, it differs in the forms of the primary volume information and secondary volume information. The logical volume No. assigned to the primary logical volume is indicated by a combination of the storage control unit No., which is the identifier of a storage control unit 20, and the logical volume No. in that frame. The same applies to the secondary volume information. This arrangement is provided because these information concern replication between and among different storage control units and the storage control units in which the logical volumes exist must be specified.

In this example, a logical volume No. and a pair No. are uniquely assigned inside a storage control unit 20, and by combining these Nos. with the No. of storage control unit 20, a No. unique inside storage system 100 is formed. However, another method is also available wherein the logical volume No. and the pair No. are assigned as serial Nos. so as to form numbers which are unique to the storage control units 20. In this case, even after logical volume transfer between and among the storage control units 20, the same Nos. will be inherited and used.

For example, as initial states of the devices, logical volume Nos. 0 to 999 are set inside the storage control unit 20A and logical volume Nos. 1000 to 1999 are set inside the storage control unit 20B. When the logical volume of No. 200 inside the storage control unit 20A is to be copied and transferred to the logical volume of No. 1200 inside the storage control unit 20B, the logical volume No. 200 is inherited and used by the storage control unit 20B (upon being attached to the secondary logical volume). Here, the logical volume No. 200 of storage control unit 20A is exchanged with the logical volume No. 1200 of storage control unit 20B, since simply inheriting the No. 200 causes the disappearance of the logical volume No. 1200 of the storage control unit 20B, the copy destination. That is, after the data transfer, the logical volume No. 1200 exists in the storage control unit 20A and the logical volume No. 200 exists in the storage control unit 20B.

FIG. 7 is a diagram showing an example of volume information table Ct2. The volume information table Ct2 registers information for managing logical volumes belonging to the storage control unit 20 and is stored in the common memory 22 inside the storage control unit 20. The volume information table Ct2 contains the entries of logical volume No., primary/secondary flag, counterpart volume information, logical volume usage flag, and external storage control unit logical volume usage flag.

The logical volume No. is an identifier assigned to a logical volume. FIG. 7 shows an example where three pairs are formed for the logical volume of No. 0. The table in FIG. 7 indicates that with the first pair from the top, the secondary logical volume that is the counterpart logical volume has a logical volume of No. 20 of the storage control unit of No. 1. The second pair is shown to have a secondary logical volume with the logical volume of No. 158 within the same storage control unit. The third pair is formed in the same manner as the first pair. The fourth pair shows that the logical volume of No. 1 is used as the secondary logical volume and the primary logical volume is the logical volume of No. 3783 of the storage control unit of No. 3.

The primary/secondary flag indicates whether a logical volume serves as the primary portion or as the secondary portion of a pair. The counterpart volume information is the volume information of the counterpart by which a pair is formed and comprises a storage control unit No. and a logical volume No. In the case of a pair formed inside the same storage control unit, the logical volume No. of the secondary logical volume is registered as the logical volume No. in the counterpart volume information. In the case of a pair formed across different storage control units, the storage control unit No. and the logical volume No. of the secondary logical volume are registered in the counterpart volume information. The logical volume usage flag is information indicating whether or not the corresponding logical volume is being used or is empty. The external storage control unit usage flag is information indicating whether or not the corresponding logical volume is being used as a logical volume of the external storage control unit.

<<System Processes>>

The processes of the entire system, including the storage system 100, will now be described. First, command operations from the storage control units to the external storage control unit will be described. Processes of transferring replication pairs between and among the storage control units will then be described. In regard to these replication pair transfer processes, transfer processes inside the same storage control unit and transfer processes spanning different frames will be described separately. Then, transfer logical volume determination processes that are performed at first in transfer processes inside the same storage control unit will be described. In regard to the transfer logical volume determination processes, three cases of device addition, device elimination, and load distribution will be described separately. Furthermore, a transfer timing arbitration process will be described.

<Command Operations to the External Storage Control Unit>

Upon receiving an input/output request from the host 51, the storage control unit 20 judges whether or not the logical volume that is the entity of the LU to be subject to the input/output exists in the storage control unit 20 or in the external storage control unit 70. If the "-" symbol, which indicates non-use, is stored in the external storage control unit logical volume usage flag of the volume information table Ct2, the logical volume exists in the storage control unit 20, and the corresponding LDEV (Logical Device, logical volume) in the disk device 24 is accessed by a normal operation. If the flag is set to "in use," the logical volume exists inside the external storage control unit 70 and the storage control unit 20 remakes an input/output request to the external storage control unit 70. The default value of the external storage control unit logical volume usage flag is the "-" symbol, and "in use" is stored when a logical volume with entity inside the external storage control unit 70 is to be managed.

Figure 8A:
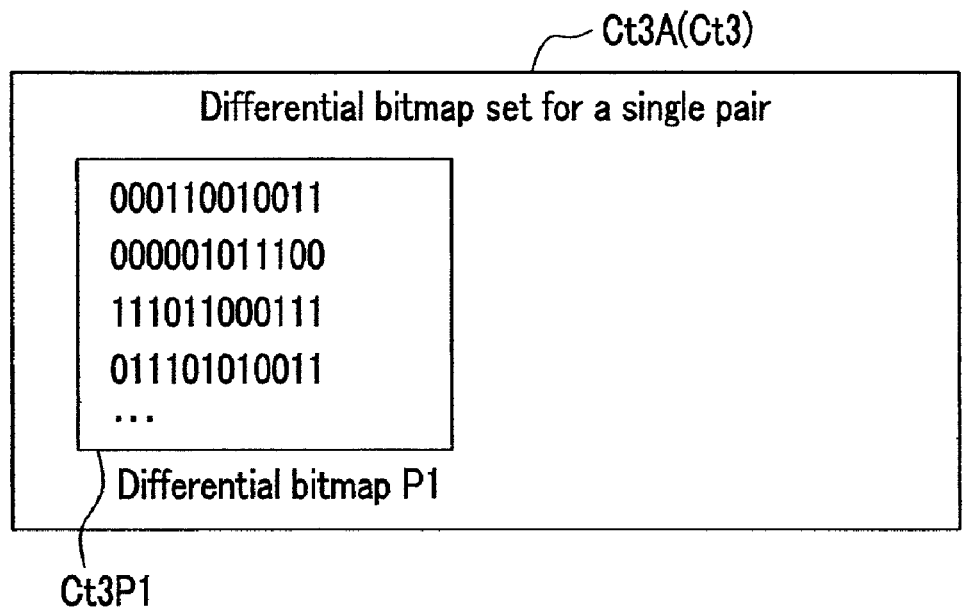
FIG. 8A is a diagram showing a differential bitmap in an example, where one differential bitmap is prepared.
Figure 8B:
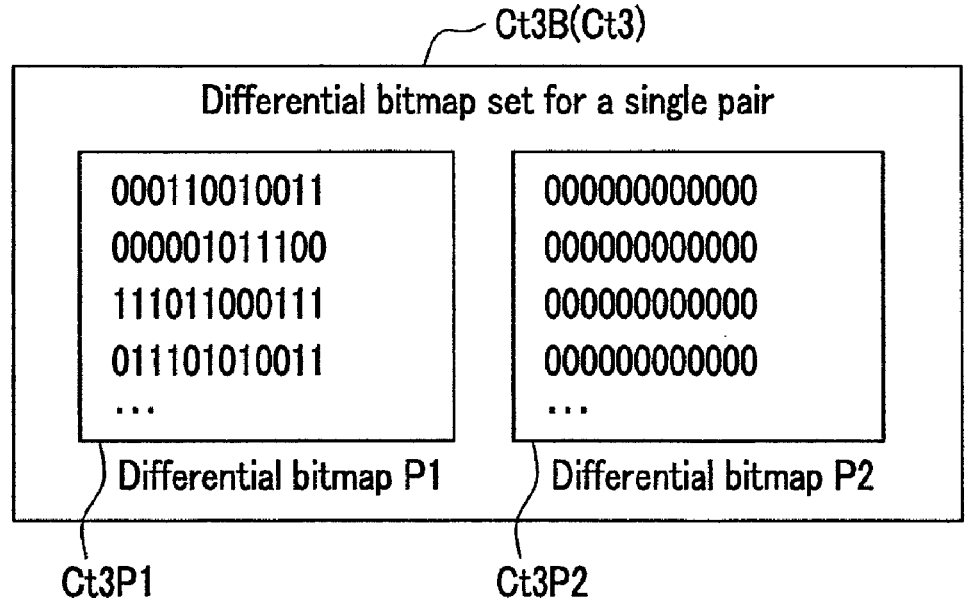
FIG. 8B is a diagram showing a differential bitmap in an example, where two bitmaps of the same size are prepared for a single pair.

FIGS. 8A and 8B each shows a diagram of a differential bitmap Ct3 in an example. "0" in a differential bitmap Ct3 expresses a location at which copying from the primary logical volume to the secondary logical volume has ended, and "1" expresses a location at which the copying has not ended. In the differential bitmap Ct3, data with a predetermined data size is made to correspond to 1 bit. For example, in case 64 Kbytes of data is made to correspond to 1 bit, even when just 1 bit in the data of 64 Kbytes has been renewed, the bit is set to "1" so that the contents will be reflected at the copy destination as well. FIG. 8A shows an example of preparing one differential bitmap, and FIG. 8B an example of preparing two bitmaps with the same size for one pair.

A process of initially copying the entire contents of the primary logical volume, which is the copy source of a pair, to the secondary logical volume, which is the copy destination, is referred to as an initial copy or a formation copy. In an initial copy, all bits of a differential bitmap Ct3P1 (see FIG. 8A) are set to "1." In the copy process, each time a "1" in the differential bitmap is detected, whether or not the data of the location corresponding to the bit exists in a cache memory (a portion of common memory 22 shown in FIG. 1) is judged. If the data is not in the cache memory, the data is read into the cache memory from the primary logical volume and copied inside the cache memory for data of the secondary logical volume. Accompanying with this copying, redundant information (for example, parity data) for judging whether the data are correct are also newly created for the secondary logical volume and attached to the data. Upon storage in the cache memory, the corresponding bit of differential bitmap Ct3P1 is set to "0." The process is repeated when the next "1" bit is found. A method may also be employed wherein when data is read from the abovementioned primary logical volume, the data is stored directly in the cache memory as the data for the secondary logical volume upon creating redundant information for the secondary logical volume. A method may also be employed wherein the data for the secondary logical volume in the cache memory is asynchronously stored into the secondary logical volume.

In the above-described process, data synchronization is carried out between the primary and secondary logical volumes and the primary logical volume and the secondary logical volume are put in the pair status. By the storage control unit 20 then "splitting" the pair in the pair status at an arbitrary time, the data held by the pair at the arbitrary time is saved in the secondary logical volume.

Normally, the splitting is executed at the point at which an initial copy is ended and the contents of the primary logical volume and the secondary logical volume are synchronized. Meanwhile, there is an art called "fast splitting," with which, even when a split request is received during initial copying, a split completion report is made instantly to host 51 and the rest of the copying is executed in the background. During the "fast splitting", the differential bitmap Ct3P1 (for formation copy) and a differential bitmap Ct3P2 (which records the updating after the splitting, that is, records the differences) are used in combination as shown in FIG. 8B at the storage control unit 20 to realize fast splitting.

Though the tables of FIGS. 5 to 7 were shown with table structures as examples, it suffices to provide the abovementioned information and the data structures of the information are not restricted in particular. For example, the structures may be list structures. The form in which the information is held is thus not an essence of this invention.

<Processes of Transferring Replication Pairs Between and Among Storage Control Units>

Processes of transferring replication pairs between and among the storage control units will now be described. A replication pair refers to a pair formed of the primary logical volume and the secondary logical volume. Though in the present description a case is used in which a single replication is created at the copy source, all relevant logical volumes can be transferred in likewise manner, even in cases where a plurality of replications are created for the primary logical volume (multipair), cases where a further copy is created from the secondary logical volume (the secondary logical volume becomes the primary logical volume of another pair) (cascade), and cases where replications are created in units besides the logical volume unit. In the case of a cascade, it shall be deemed that one pair is formed by the primary logical volume and the secondary logical volume, and one pair is formed by rendering this secondary logical volume the primary logical volume. Though the following description concerns an example in which the virtualization device 52 performs a multipath virtualization process for the same LUs, the layer to be virtualized is not limited to any particular one. For example, this layer may be the program layer of the host 51.

[Transfer or a pair unit inside the same storage control unit]

In accordance with the flowchart of FIG. 10, a process of transferring a pair of logical volumes (in the process of formation copy), of a logically managed external storage control unit 70, from inside a storage control unit 20A into a different storage control unit 20B will now be described.

The process of S1010 as a pre-transfer process wherein the management server 50 determines which logical volumes are to be transferred to where, will be described in detail later. First, from the service processor (SVP) 81 to the transfer destination storage control unit 20B (S1020), transfer of the logical volumes and the volume information (transfer source logical volume) of those logical volumes are notified. Consequently, the transfer destination storage control unit 20B acquires configuration information (volume information of the external storage control unit 70) from transfer source storage control unit 20A (S1030). If replication is in progress, the configuration information contains pair information. This acquisition of configuration information is carried out via SAN 41. The transfer source storage control unit 20A then notifies the transfer source logical volume Nos. to the virtualization device 52 (S1040). The transfer destination storage control unit 20B sets up LUs anew for the portion to be transferred (S1050) and registers these in the volume information table Ct2 inside the storage control unit 20B. If the unit of transfer is a pair, registration is made for a pair, and in the case of multipairs, registration is made for the number of multiple pairs. Also in the case of cascades, registration is performed for the number of cascades.

If the transfer source logical volumes form replication logical volumes, the same replication information (logical volume pair relationship) as those in the transfer source storage control unit 20A are set in the newly set LUs and registered (S1060). The in-transfer logical volume pair setting program Mr12 sets and registers the LUs and the pair information, registered in the volume information table Ct2, in a volume pair information management table Ct1A. The storage control unit No. and the pair No. of the transfer source pair are also registered in the transfer destination pair information management table Ct1A. The in-transfer logical volume pair setting program Mr12 simply sets that there is a replication pair relationship and sets the formation copy bit of the abovementioned pair No. registered in the volume pair information management table Ct1A to "1", to prevent the initial copy from being conducted (S1070). Also, in order to prevent acceptance of access to the secondary logical volume that is the copy destination, the secondary access enabling bit of the abovementioned pair No. registered in the volume pair information management table Ct1A is set to "1" (S1070). In order to unify the pairing statuses of the transfer source and the transfer destination to the same status, "Pair (copy in progress)," which is the same status as that of the transfer source, is registered as the pairing status at the transfer destination storage control unit 20B even if formation copy, which is the initial copy for creating a pair, is not carried out.

The transfer destination storage control unit 20B notifies the new LU Nos. of the transfer destination to the virtualization device 52 (S1080).

At the virtualization device 52, the interframe multipath program Mc2 (see FIG. 3) of the exchange path software Mc100 recognizes, from the same-device correspondence table Vt1, that the transfer source LUs and the new LUs of the transfer destination indicate the same actual logical volumes (S1090). Specifically, for example there is a method wherein as shown in same-device correspondence table Vt1 of FIG. 5, a storage control unit identifier, which is an identifier that distinguishes the storage control unit of the access destination, and an LU No. within that storage control unit are specified for each path. With this method, the exchange path software Mc100 cannot recognize that the entities of LUs inside the different storage control units are LUs inside the same external storage control unit. Thus apart from the conventional information that do not distinguish frames, the same-device correspondence identifier information, which is information that indicates that the entity is the same LU, is provided anew, and the interframe multipath program Mc2 (see FIG. 3) of the exchange path software Mc100 sets multipaths even between and among storage control units that differ in frame and makes it be recognized that the entities are logical volumes in the same external storage control unit. With the example of FIG. 5, the paths of No. 0, No. 2, and No. 3 are paths to LUs of the same entity. The interframe multipath program Mc2 then opens (sets) a path from the virtualization device 52 to the transfer destination storage control unit 20B (S1095).

As methods by which configuration information are acquired and set at the transfer destination in S1030, (1) the management server 50 may issue a command to the storage control unit 20 for acquisition (the information may be taken up by the management server 50 once or an instruction may be issued to the storage control unit 20 to perform acquisition and setting by communication between the storage control units), (2) the transfer source information may be acquired via the SVP 81 and handed over to the SVP 81 of the transfer destination, (3) the host 51 may issue a command to perform acquisition (the same as (1)), or (4) the information may be written into a logical volume (dedicated logical volume or empty logical volume) inside the external storage control unit 70 and then taken up by the transfer destination, etc. In this process (S1095 and onwards), a path (passing through SAN 41) is also formed between the transfer source storage control unit 20A and the transfer destination storage control unit 20B. This path is used to send a command, received by the transfer destination storage control unit 20B, to the external storage control unit 70 via the transfer source storage control unit 20A.

Figure 10:
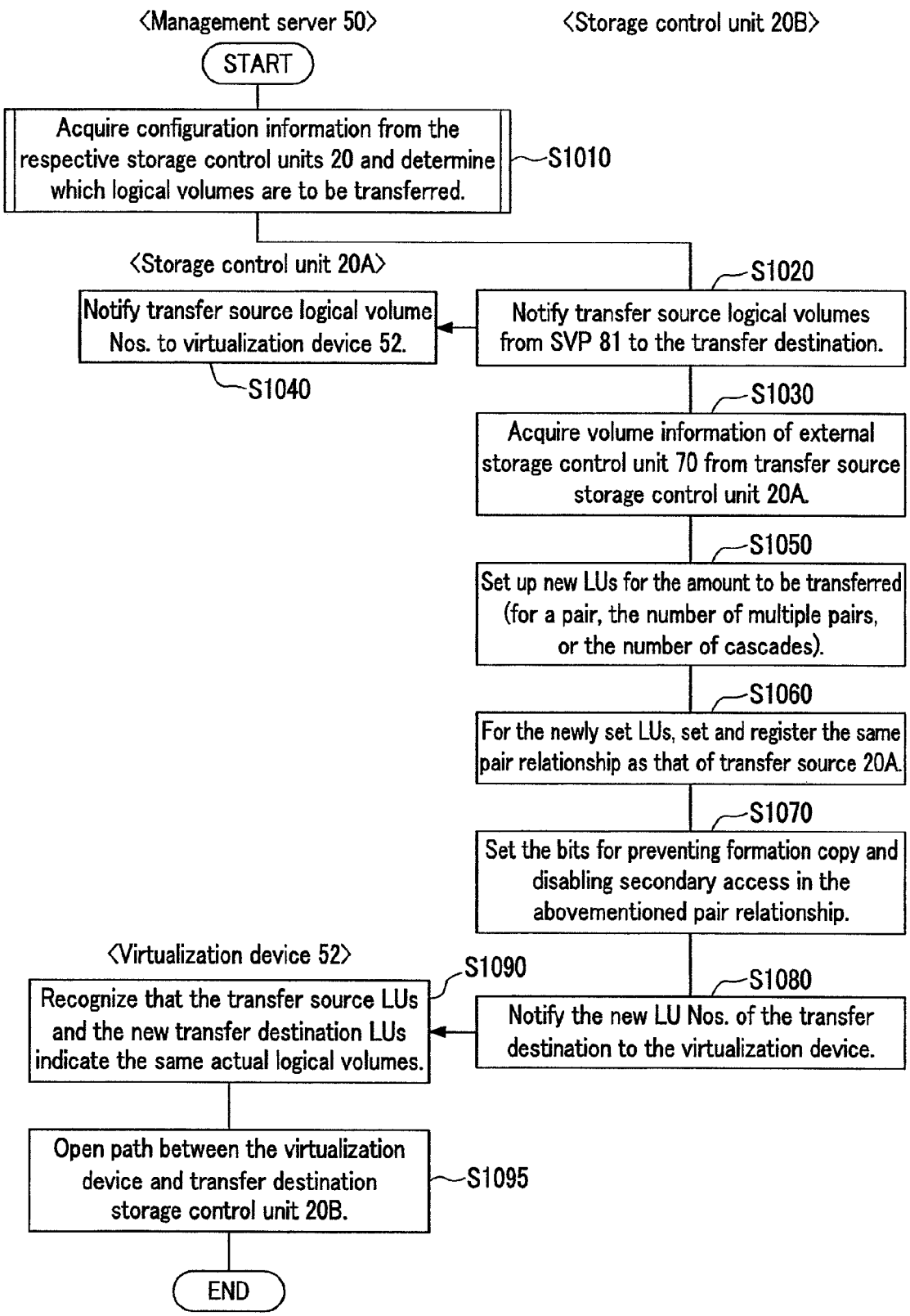
FIG. 10 is a flowchart illustrating a process prior to transferring a pair of logical volumes between storage control units.

Suppose that prior to the starting of the transfer process in FIG. 10, the pair is in the process of formation copy. In this case, an initial copy process of copying the entire contents of the primary logical volume to the secondary logical volume is being carried out. During the process of FIG. 10, a formation copy bitmap is held and used in transfer source storage control unit 20A. In performing the copy process, the CPU 21 inside the storage control unit 20A starts up and executes a program.

Figure 15:
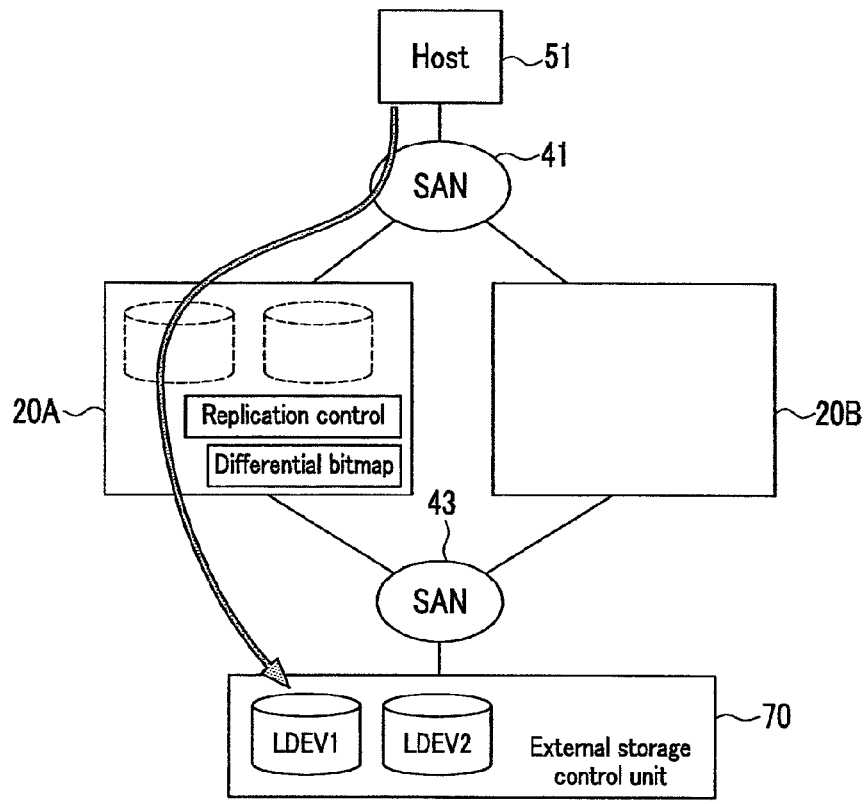
FIG. 15 is a diagram showing a configuration and an I/O pathway that takes note of the logical volumes of a pair to be transferred.

FIG. 15 is a diagram showing the configuration and the I/O pathway that takes note of the logical volumes of a pair to be subject to transfer. Here, it is deemed that interframe multipaths are virtualized at the host 51. For the pair of logical volume 1 (LDEV1: Logical Device 1) and logical volume 2 (LDEV2), which have entities in the external storage control unit 70, virtualization and LU management are carried out in the storage control unit 20A. When the host 51 issues an I/O to the pair of logical volumes, the multipath management program Mc1 (see FIG. 3) of the exchange path software Mc100 in the host 51 searches for the paths assigned to the logical volumes for which the request was made. Since up to the point of S1090, there are only paths that pass through the storage control unit 20A, a path is selected from the plurality of paths and the I/O is issued. If a normal I/O (write request) is issued, "1" is set in the formation copy bitmap. The steps up to here make up the process of setting paths between the storage control unit 20 and the virtualization device 52.

A process of starting actual transfer to a different frame (different storage control unit) will now be described in accordance with the flowchart of FIG. 11.

In order to start the actual transfer process, the host 51 (or the management server 50 or the MSVP 80) issues a "split (pair splitting)" instruction to a pair in the storage control unit 20A (S1110). In response to this instruction, splitting is performed at the transfer source storage control unit 20A. The pairing status is changed, that is, renewed from "pair" to "split" (S1115) and if a write request is made subsequently, recording in the differential bitmap (the differential bitmap Ct3P2 in the present case) in the storage control unit 20A is carried out. As a part of the transfer process, the transfer source storage control unit 20A hands over the "split" instruction to the transfer destination storage control unit 20B via SAN 41 (S1120). In this process, the storage control unit identifier and the volume pair information of the transfer source are also handed over.

In response to the instruction from the transfer source storage control unit 20A, the transfer destination storage control unit 20B searches for the pair to be split (S1125). Specifically, the corresponding pair at the transfer destination can be searched by searching for the volume pair information on the transfer source that are registered in volume pair information management table Ct1A (see FIG. 6A). When the search is accomplished, the splitting (changing of the pairing status, merging of the differences) of the corresponding pair is carried out at the transfer destination storage control unit 20B (S1130). Specifically, the pairing status of the pair No., searched as mentioned above in the volume pair information management table Ct1A, is changed in the same manner as in S1115 (renewed to "Split" in the present case). Furthermore, the contents of the differential bitmap Ct3P1, which was used for formation copy prior to the splitting of the corresponding pair at the transfer source storage control unit 20A, are merged with those of the formation copy differential bitmap Ct3P1 of the corresponding pair in the transfer destination storage control unit 20B (it shall be deemed that formation copy differential bitmap Ct3P1 has been initialized). The contents of the differential bitmap Ct3P2 are also merged. Preparations are thus made for acquisition of differential bits when a new I/O is received at the transfer destination storage control unit 20B. Here, merge refers to the forming of new bitmap from the results of performing OR operations on corresponding bits of two bitmaps.

Upon completion of the difference merging (preparation), the transfer destination storage control unit 20B notifies this to the transfer source storage control unit 20A and the virtualization device 52 (S1135). As one method to be employed between the start and completion of the respective merging of the abovementioned differential bitmaps Ct3P1 and Ct3P2, new I/O's are not received and when a new I/O arrives, a receive disabled is returned to the host 51, which is then made to make a request again after the elapse of a predetermined amount of time. As another method, new I/O's are received and if the subject of the I/O request is a portion for which the difference merging has been completed, the request is processed upon referencing the differential bitmap of the transfer destination storage control unit 20B while if the subject of the I/O request is a portion for which the difference merging has not been completed, the request is processed upon referencing the differential bitmap of the transfer source storage control unit 20A. In this process, whether or not formation copy has ended is checked by means of the differential bitmap Ct3P1 and if it has not ended, a writing process is performed after formation copy of the corresponding location has ended. If formation copy has ended, the writing process is performed. This writing process is carried out at the storage control unit 20 that received the new I/O.

Then by means of the priority control program Mc3, the virtualization device 52 performs a setting such that in processing an I/O for multipaths spanned between different frames, a path of the transfer destination frame will receive the I/O 100% of the time (S1140).

During this process, the processing of I/O's that has already been received continues and when processing of an I/O that has been received already via the transfer source storage control unit 20A (the old route of FIG. 16) is completed, a completion report is made from the transfer source storage control unit 20A to the host 51, and when all processes are completed, the LUs that has been subject to transfer are deleted (the information in the volume information table are cleared) (S1150). In order to make the LU information of the transfer source invalid here, a method of setting a bit indicating whether information is valid or invalid according to LU No. may be employed. The transfer source volume pair information of the transferred pair is also deleted (S1150). During this time, the storage control unit 20B is connected to the external storage control unit 70 and put on standby (S1160). Also, the storage control unit 20A carries out emergency destage (performing of writing from the cache memory to the disk device 24 with top priority), and when a new write request is made subsequently, the writing is executed in the write-through mode, wherein the data are not stored in the cache memory but are written directly into the disk device 24 (S1165). The data in the cache memory and new access requests are thereby reflected completely in the disk device 24. When the emergency destage is ended for all logical volumes of the transferred unit (Y in S1170), since dirty data (new data not reflected in the disk device 24) will not be left in the cache memory of the transfer source storage control unit 20A, complete transfer to the transfer destination storage control unit 20B is enabled and the storage control unit 20B connects to the external storage control unit 70 (S1175).

In the above-described process, the "split" instruction may be issued from the host 51 directly to the transfer destination storage control unit 20B.

Until the emergency destage at the storage control unit 20A ends, the storage control unit 20B receives new I/O's. In this process, the storage control unit 20B transfers the received I/O's to the storage control unit 20A via the SAN 41 between the storage control units 20. When the merging of the differential bitmaps have been completed and an I/O is received thereafter, before transferring the I/O to the storage control unit 20A, the corresponding bits of the differential bitmap Ct3P2, between the two differential bitmaps (see FIG. 8B) of the storage control unit 20B, are set to "1." Whether or not formation copy has ended is checked at that point and if it has not ended, the writing process is performed after the formation copy of that location has ended. If formation copy has ended, the continuation of the copy process is executed at the storage control unit 20B side while referencing formation copy bitmap Ct3P1.

Figure 16:
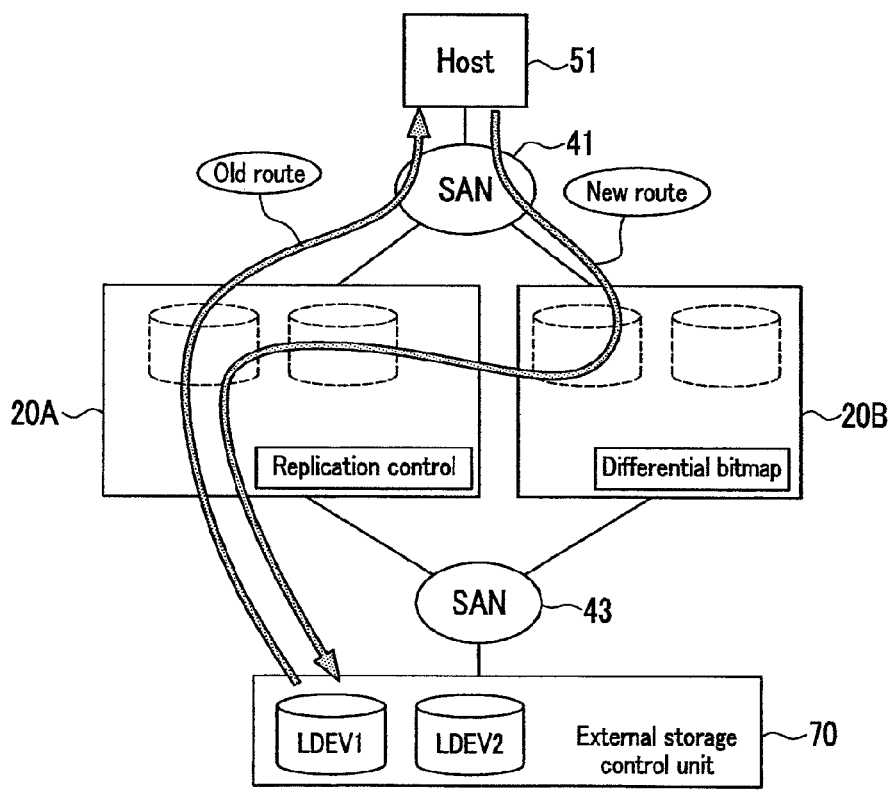
FIG. 16 is a diagram showing a configuration and an I/O pathway that takes note of the logical volumes of a pair to be transferred.
Figure 17:
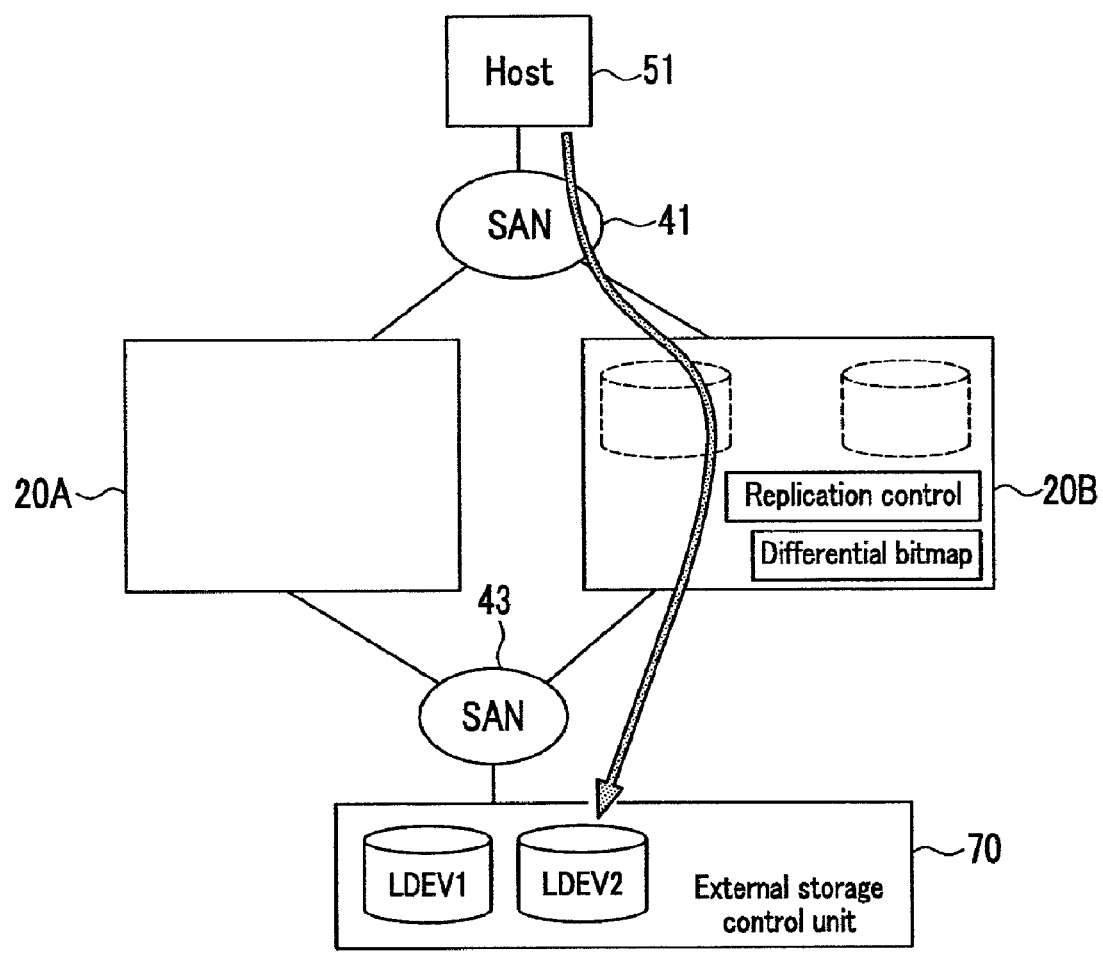
FIG. 17 is a diagram showing a configuration and an I/O pathway that takes note of the logical volumes of a pair to be transferred.

As with FIG. 15, FIG. 16 is a diagram showing the configuration and the I/O pathway that takes note of the logical volumes of a pair to be subject to transfer. In the state illustrated here, the storage control unit 20A and the storage control unit 20B sets LUs and carries out management for the pair of LDEV1 and LDEV2, which have entities in the external storage control unit 70. When the host 51 issues an I/O to the pair of logical volumes, the process is executed via the storage control unit 20B side by priority control. For I/O's that have been received already at the storage control unit 20A, completion reports are made from the storage control unit 20A. When the processing of all I/O's that have been received at S1150 is completed, the old route disappears, only the new route exists. However, until completion of the emergency destage of S1165, the storage control unit 20A performs the actual processing. Also the cache memory in the storage control unit 20A is used and that in the storage control unit 20B is not used. When the emergency destage of S1165 is ended, switching to processing at the storage control unit 20B, as shown in FIG. 17, is carried out. At the point at which emergency destage is completed, the cache memory in the storage control unit 20A is no longer used and that in the storage control unit 20B is used. When the processing is transferred to the storage control unit 20B completely, the path (via SAN 41) that was used between the storage control units 20 during transfer becomes unused.

Though a method wherein the issuing of the "split" request was used as the timing for starting the transfer process was employed here, a method of starting the transfer process after the formation copy is ended may be employed instead. In this case, after the end of formation copy, a command for starting transfer may be introduced anew or processing may be carried out so that transfer is performed when formation copy is ended at the storage control unit side.

Also, though a case where a transfer process is carried out during copying was described with the present example, the same flow applies to a case where a transfer process is carried out during splitting. However, in merging the transfer source differential bitmap at the transfer destination, if formation copy has been ended already, it suffices just to merge the differential bitmap Ct3P2 without merging the formation copy bitmap Ct3P1.

Figure 9A:
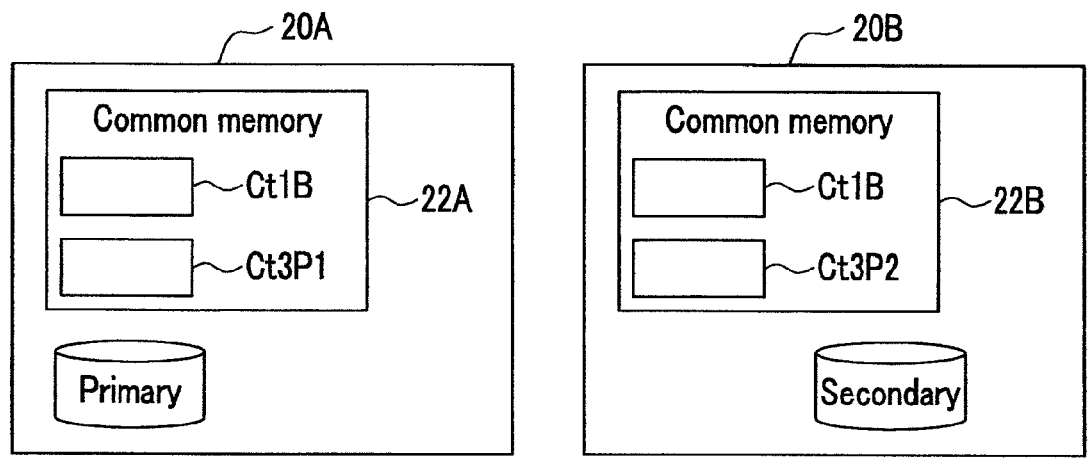
FIG. 9A is a diagram showing differential bitmap configuration across storage control units, in a one-bitmap configuration.
Figure 9B:
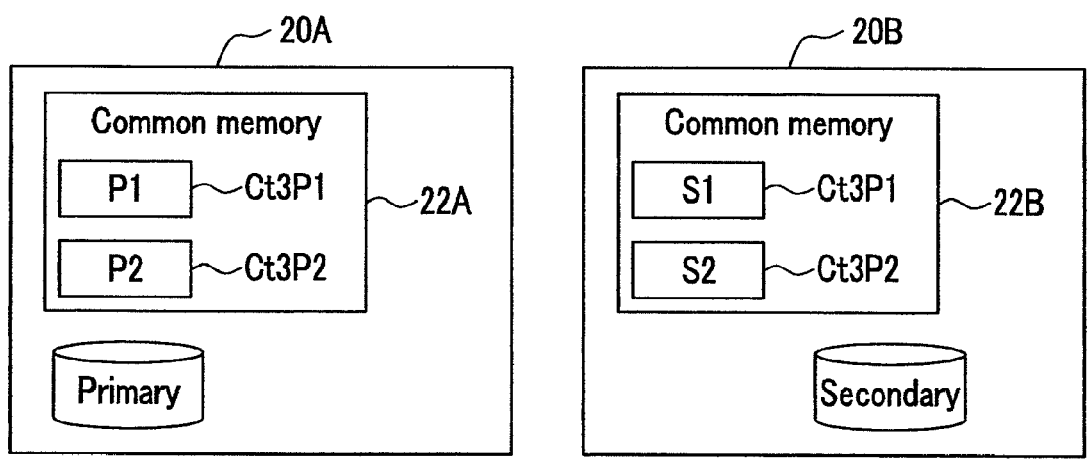
FIG. 9B is a diagram showing differential bitmap configuration across storage control units, in a two-bitmap configuration.

In the case where a "split" request is issued during formation copy or in the case where a transfer process is to be performed during splitting, in order to utilize the above-described fast splitting art, the differential bitmap is provided with the two-map configuration shown in FIG. 8B and set up as shown in FIG. 9B. In the case where a transfer process is to be performed after completion of formation copy, the differential bitmap is provided with the one-map configuration shown in FIG. 8A and set up as shown in FIG. 9A.

Also, after performing the transfer process of the primary logical volume, copying from the primary logical volume to the secondary logical volume may be performed at the transfer destination storage control unit 20B. It may be judged that such copying after the transfer process should be performed, for example, in a case where the amount of data already copied at the transfer source storage control unit 20A is less than a predetermined proportion.

[Transfer Process Spanning Across Different Frames]

A process will now be described in which either the primary or secondary logical volume of the pair is transferred from inside the same storage control unit 20A to a different storage control unit 20B, for a pair of logically managed volumes (in the process of formation copy) of the external storage control unit 70.

The preliminary settings accompanying the transfer are the same as those of the flowchart of FIG. 10. In S1050, the transfer destination storage control unit 20B sets LUs anew for the amount to be transferred and registers these in the volume information table Ct2 in the storage control unit 20B. At this point, LUs corresponding to the number of transferred logical volumes are set. Also the same replication information (volume pair information) as those in the transfer source are set and registered for the newly set LUs. That is, the in-transfer logical volume pair setting program Mr12 sets and registers the LUs and pair information which have been registered in the volume information table Ct2, into the volume pair information management table Ct1B. As the primary and secondary volume information, the storage control unit Nos. and logical volume Nos. are registered in the volume pair information management table Ct1B. Also, the storage control unit No. of the transfer source storage control unit 20A and the pair No. in the storage control unit 20A are registered in the volume pair information management table Ct1B at the transfer destination storage control unit 20B side. Likewise, information on the transfer destination is registered in the volume pair information management table Ct1B at transfer source storage control unit 20A side. The other information is the same as that of the volume pair information management table Ct1A. In case the pair of logical volumes span across frames, the volume pair information should be renewed later at the transfer source as well, because the volume pair information are to be held at the transfer source and the transfer destination.

In S1080, the transfer destination storage control unit 20B notifies the new LU No. of the transfer destination of a primary logical volume to the virtualization device 52. In S1090, it is recognized from the same-device correspondence table Vt1, that for the primary logical volume, the transfer source LU and the new transfer destination LU indicate the same actual logical volume. For the primary logical volume, a path between the virtualization device 52 and the transfer destination storage control unit 20B is opened (set) (S1095).

The process of actual transfer will now be described in accordance with the flowchart of FIG. 18. Here, it is be deemed that the primary logical volume of a pair is to be transferred.

A "split (pair splitting)" instruction is made from the host 51 (or the management server 50 or the MSVP 80) to the pair (S1810). The splitting process is performed at the transfer source storage control unit 20A. The pairing status is changed, that is, renewed from "pair" to "split" (S1815) and if a write request is made subsequently, recording in the differential bitmap Ct3P2 in the storage control unit 20A is carried out. As a part of the transfer process, the transfer source storage control unit 20A hands over the "split" instruction to the transfer destination storage control unit 20B via the SAN 41 (S1820). In this process, the storage control unit identifier and the pair information of the transfer source are also handed over.

In response to the instruction from the transfer source storage control unit 20A, the transfer destination storage control unit 20B searches for the pair to be split (S1825). Specifically, the corresponding pair at the transfer destination can be searched by searching the volume pair information on the transfer source that are registered in the volume pair information management table Ct1B (see FIG. 6B). When the search is accomplished, the splitting process (changing of the pairing status, merging of the differences) of the corresponding pair is carried out at the transfer destination storage control unit 20B (S1830). Specifically, the pairing status of the pair No., searched as mentioned above in the volume pair information management table Ct1B, is changed in the same manner as in S1815 (renewed to "split" here). Furthermore, the contents of the differential bitmap Ct3P1, which was used for formation copy prior to the splitting of the corresponding logical volume pair at the transfer source storage control unit 20A, are merged with those of the formation copy differential bitmap Ct3P1 of the corresponding logical volume pair in the transfer destination storage control unit 20B (it shall be deemed that formation copy differential bitmap Ct3P1 has been initialized). The contents of the differential bitmap Ct3P2 are also merged. Preparations are thus made for acquisition of differential bits when a new I/O of the primary logical volume is received at the transfer destination storage control unit 20B side.

Upon completion of the difference merging, the transfer destination storage control unit 20B notifies this to the transfer source storage control unit 20A and the virtualization device 52 (S1835). As one method to be employed between the start and completion of the merging of the above-mentioned differential bitmaps, new I/O's are not received and when a new I/O arrives, a receive disabled is returned to the host, which is then made to make a request again after the elapse of a predetermined amount of time. As another method, new I/O's are received and processes are carried out in accordance with whether or not the subject of each I/O request is a portion for which the difference merging has been completed. The details thereof are the same as those described for S1135 of FIG. 11. Then by means of priority control program Mc3, virtualization device 52 performs, for just the primary logical volume, a setting such that in processing an I/O for multipaths spanned between different frames, a path of the transfer destination frame will receive the I/O 100% of the time (S1840). For the secondary logical volume, I/O's are received and processed without changes at the transfer source storage control unit 20A.

During this process, the processing of I/O's to the primary logical volume that has already been received is continued and when processing of an I/O that has been received already via the transfer source storage control unit 20A (the old route of FIG. 16) is completed, a completion report is made from the transfer source storage control unit 20A to the host 51, and when all processes are completed, the primary logical volume's LU that has been subject to transfer is deleted (the information in volume information table Ct2 are cleared) (S1850). In order to make the LU information of the transfer source invalid here, a method of setting a bit indicating whether information is valid or invalid according to LU No. may be employed. The transfer source volume pair information of the pair subject to transfer is also renewed (S1850). During this time, storage control unit 20B is connected to the external storage control unit 70 and put on standby (S1860). Also, the storage control unit 20A carries out emergency destage (performing of writing from the cache memory to the disk device 24 at top priority) of the primary logical volume, and when a new write request is made subsequently to the primary logical volume, the writing is executed in the write-through mode, wherein the data are not stored in the cache memory (in the storage control units 20A and 20B) but are written directly into the disk device 24 (S1865). The data in the cache memory of the primary logical volume are thereby reflected completely in the disk device 24. When the emergency destage is ended for the entirety of the primary logical volume (Y in S1870), complete transfer of the primary logical volume to the transfer destination storage control unit 20B is enabled and the storage control unit 20B connects to the external storage control unit 70 (S1875). When the processing is transferred to the storage control unit 20B completely, the path (via SAN 41) that was used between the storage control units 20 during transfer becomes unused.

The case where the secondary logical volume of a pair is transferred will now be described in accordance with the flowchart of FIG. 19.

As in S1810, a "split (pair splitting)" instruction is made from the host 51 (or management server 50 or MSVP 80) to the pair (S1910). As in S1815, the splitting process is performed at the transfer source storage control unit 20A. The pairing status is changed, that is, renewed from "pair" to "split"(S1915) and if a write request is made subsequently, recording in the differential bitmap Ct3P2 in the storage control unit 20A is carried out. As in S1820, as a part of the transfer process, the transfer source storage control unit 20A hands over the "split" instruction to the transfer destination storage control unit 20B via the SAN 41 (S1920). In this process, the storage control unit identifier and the pair information of the transfer source are also handed over.

As in S1825, in response to the instruction from the transfer source storage control unit 20A, the transfer destination storage control unit 20B searches for the corresponding pair to be split (S1925). The corresponding pair at the transfer destination can be searched by searching the information on the transfer source pair that is registered in the volume pair information management table Ct1B. When the search is accomplished, the splitting process (changing of the pairing status, initialization of the differential bitmap) of the corresponding pair is carried out at the transfer destination storage control unit 20B (S1930). Specifically, the pairing status of the pair No., searched as mentioned above in the volume pair information management table Ct1B, is changed in the same manner as in S1915 (renewed to "split"here). Furthermore, the logical volume pair differential bitmap Ct3P2 of the transfer destination storage control unit 20B is initialized. Upon completion of the process, the transfer destination storage control unit 20B notifies this to the transfer source storage control unit 20A and the virtualization device 52 (S1935). Then by means of the priority control program Mc3, the virtualization device 52 performs, for just the secondary logical volume, a setting such that in processing an I/O for multipaths spanned between different frames, a path of the transfer source frame will receive the I/O 100% of the time (S1940). For the primary logical volume, I/O's are received and processed without changes at the transfer source storage control unit 20A.

During this process, the processing of I/O's to the secondary logical volume that has already been received continues, and when processing of an I/O that has been received already via transfer source storage control unit 20A (the old route of FIG. 16) is completed, a completion report is made from the transfer source storage control unit 20A to the host 51, and when all processes are completed, the secondary logical volume's LU that has been subject to transfer is deleted (the information in the volume information table Ct2 are cleared) (S1950). In order to make the LU information of the transfer source invalid here, a method of setting a bit indicating whether information is valid or invalid according to LU No. may be employed. The transfer source volume pair information of the pair subject to transfer is also renewed (S1950). During this time, the storage control unit 20B is connected to the external storage control unit 70 for the secondary logical volume and put on standby (S1960). Also, the storage control unit 20A carries out emergency destage of the secondary logical volume, and when a new write request is made subsequently to the secondary logical volume, the writing is executed in the write-through mode, wherein the data is not stored in the cache memory (in storage control units 20A and 20B) but is written directly into the disk device 24 (S1965). The data in the cache memory of the secondary logical volume is thereby incorporated completely in the disk device 24. When the emergency destage is ended for the entirety of the secondary logical volume (Y in S1970), complete transfer of the secondary logical volume to the transfer destination storage control unit 20B is enabled, and the storage control unit 20B connects to the external storage control unit 70 (S1975). The secondary logical volume may be transferred to the storage control unit 20B after performing formation copy. When the processing is transferred to the storage control unit 20B completely, the path (via SAN 41) that was used between the storage control units 20 during transfer will no longer be used.

Figure 18:
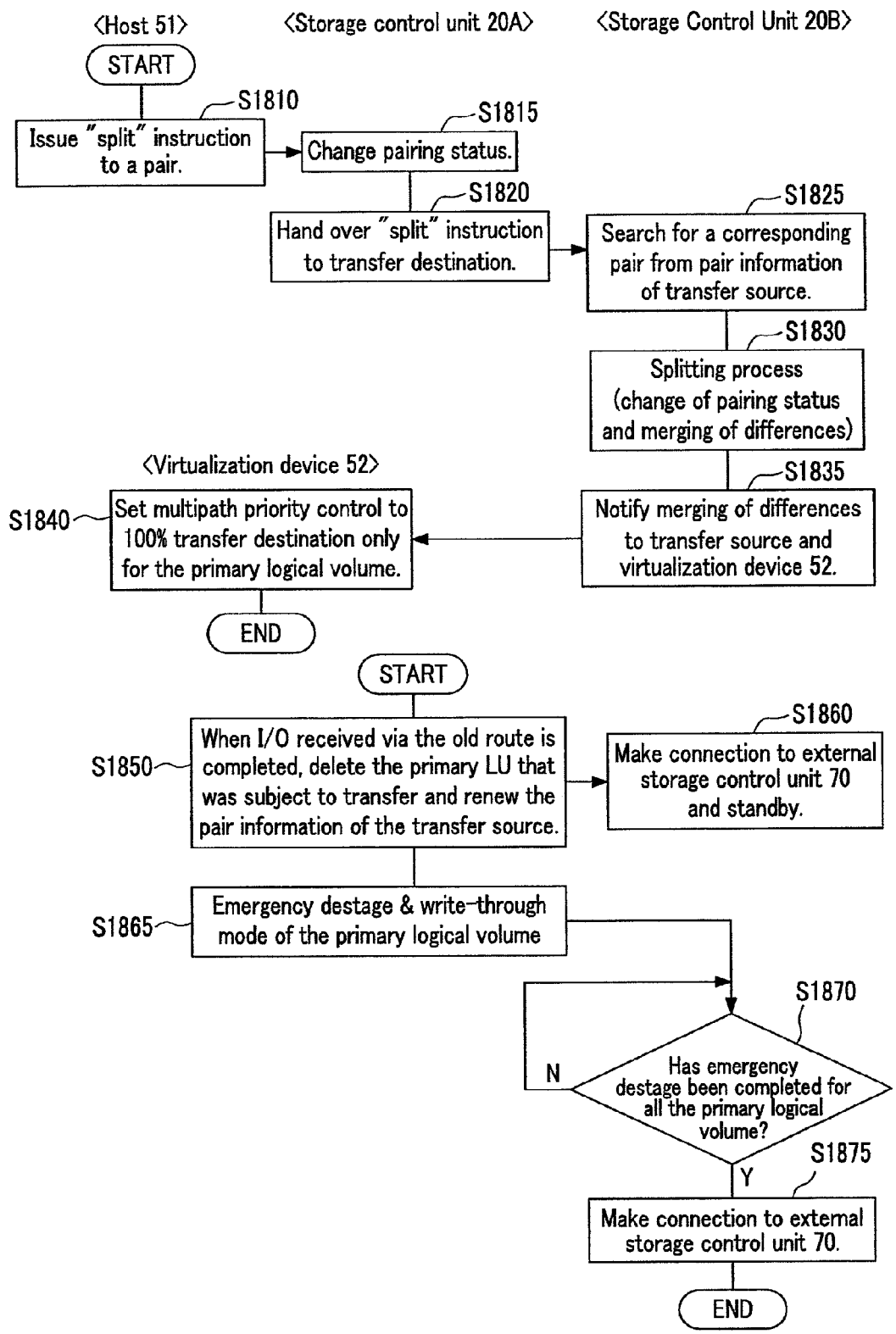
FIG. 18 is a flowchart illustrating a process for transferring a primary logical volume of a pair of logical volumes between storage control units.

When during the transfer process of FIG. 18, a request to write to the primary logical volume arrives after completion of the merging of the differential bitmaps, the corresponding bits of the differential bitmap Ct3P2, between the two differential bitmaps of the storage control unit 20B, are set to "1." Whether or not formation copy has ended is checked at that point and if it has not ended, the writing process is performed after the formation copy of that location has ended. If formation copy has ended, the copy process at the storage control unit 20B side is continued while referencing the differential bitmap Ct3P2. When an I/O to the secondary logical volume arrives, the formation copy bit of the storage control unit 20B is referenced, and if formation copy has not ended, the processing is performed after the formation copy of that location has ended, while if formation copy has ended, a normal read/write process is carried out upon setting the corresponding bits of the differential bitmap Ct3P2 of the storage control unit 20A to "1," only in the case of a write request.

The formation copy bit is referenced by inquiring with the storage control unit 20B via the SAN 41.

Also if formation copy has not ended, the storage control unit 20B carries out staging (reading to the cache memory) of the data to be copied and transmits the data from the cache memory to the storage control unit 20A via the SAN 41.

In the case of transfer across frames, the volume pair information management table CUB and the differential maps Ct3P1 and Ct3P2 are set up in both of the storage control units 20 as shown in FIG. 9A. When the above-described fast splitting is not performed and the "split" instruction is received, copying continues until the contents of the logical volumes actually become the same. If splitting is performed after this process completes, the transfer between frames can be realized by the storage control units each having one differential bitmap as shown in FIG. 9A.

I/O processes after transferring is performed across frames are described in Japanese Patent Application No. 2004-115693 by the present Applicant.

Figure 19:
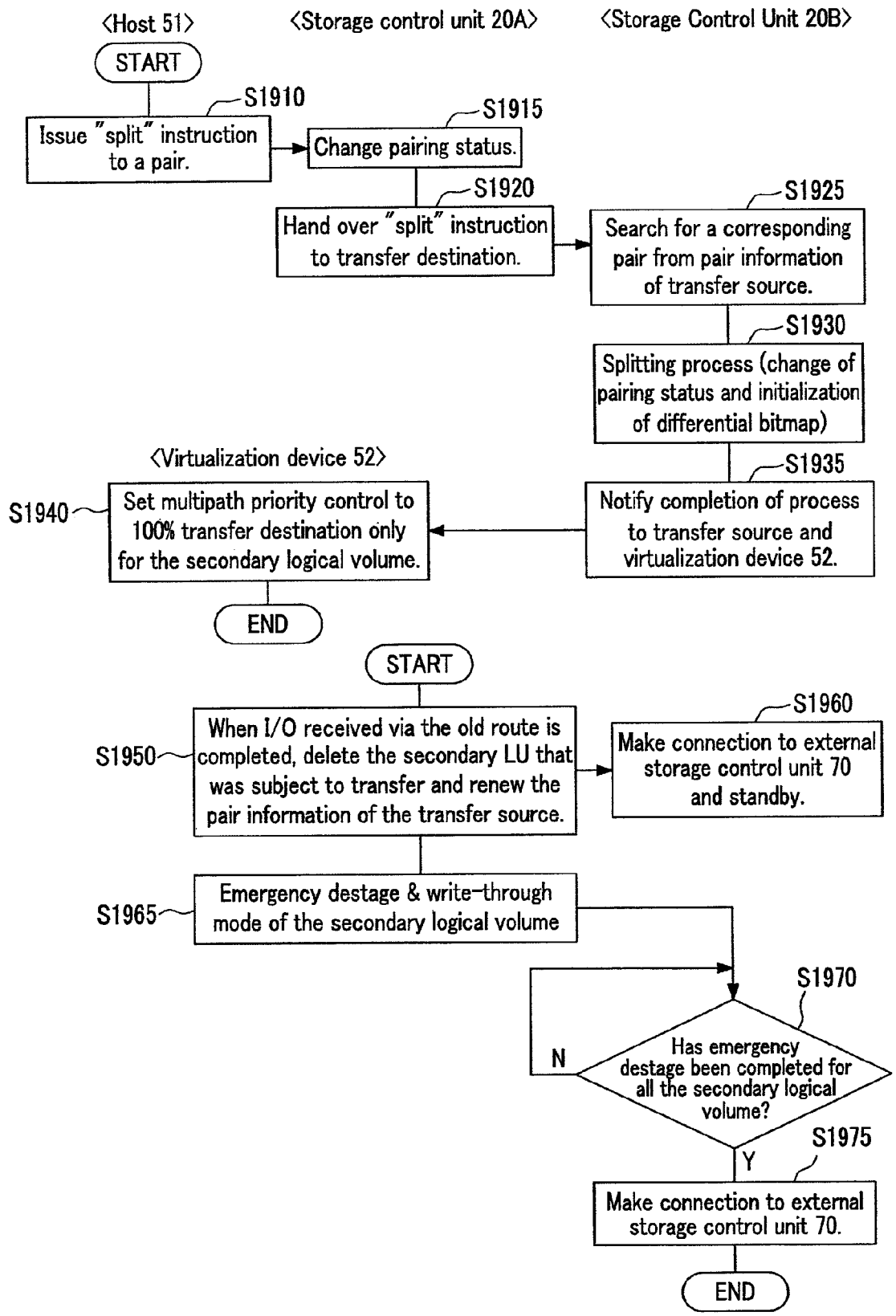
FIG. 19 is a flowchart illustrating a process for transferring a secondary logical volume of a pair of logical volumes between storage control units.

If only the secondary logical volume of FIG. 19 is to be transferred in order to manage the formation copying differential bitmap Ct3P1 at the storage control unit 20A of the primary logical volume side, the merging of differential bitmaps does not occur. Besides this, the processes are the same as those in the flowchart of FIG. 18.

<Processes of Determining the Logical Volumes to be Transferred>

The process (pre-transfer process) of determining which logical volumes are to be transferred in S1010 of FIG. 10 will now be described in accordance with the flowcharts of FIGS. 12 to 14. The pre-transfer process differs depending on whether the transfer process is to be conducted by adding or eliminating the storage control units 20, or by improving the processing performance by optimizing the resource usage rate (load distribution) of the storage control units 20 in an existing configuration.

[Process in the Case of Adding a Unit]

Figure 12:
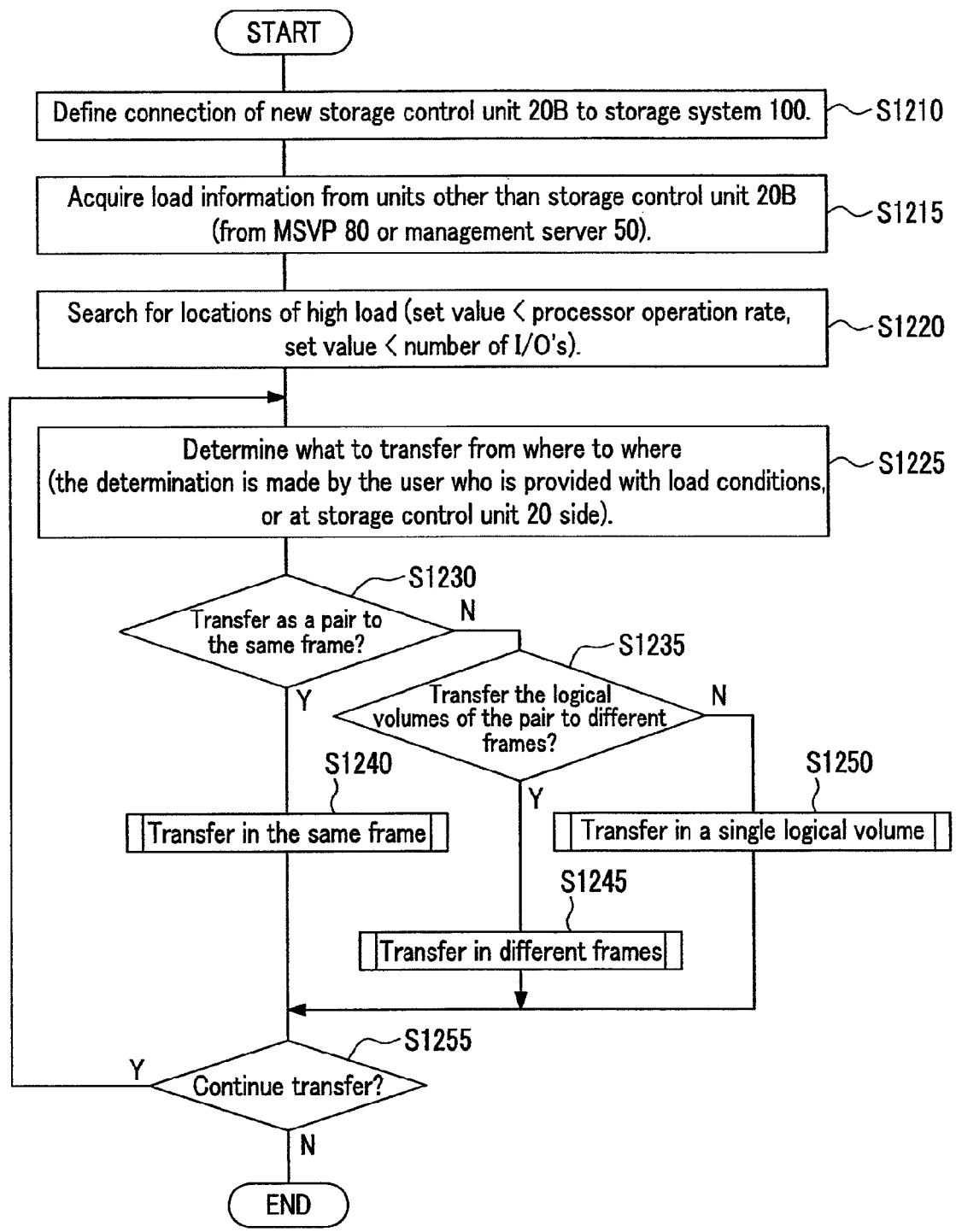
FIG. 12 is a flowchart illustrating a pre-transfer process in case a storage control unit is added.

FIG. 12 is a flowchart illustrating a pre-transfer process for the case of adding a storage control unit. Here, it is assumed that the storage control unit 20B is newly added. First, the management server 50 or another SAN management server defines the connection of the new storage control unit 20B to the storage system 100 (S1210). Specifically, the definition content is input by a user into the management server 50, for example, and stored in a predetermined common memory. Load information is then acquired from existing storage control units other than the storage control unit 20B (S1215). The load information is acquired via the MSVP 80 or the management server 50. Locations of high load are then searched from the acquired load information (S1220). Specifically, a processor having a processor operation rate higher than a preset value is searched, or a logical volume for which I/O's are issued more exceedingly than a preset number of I/O's, is searched. The storage control unit 20 with the processor, logical volumes, or other resource of high load is then specified, and which logical volumes within this storage control unit are to be actually transferred is determined. Specifically, the load information is indicated to the user and the user determines and inputs the logical volumes to be transferred or the logical volumes to be transferred are determined automatically within the storage control unit 20 (S1225). Though the default transfer destination is the storage control unit 20B, another unit may be selected instead.

If the logical volumes to be subject to transfer are to be transferred as a pair to the same frame (Y in S1230), the process of transfer within the same frame (see FIG. 10 and FIG. 11) is executed (S1240). If the logical volumes are not to be transferred as a pair to the same frame, (N in S1230), it is judged whether or not the logical volumes of the pair are to be transferred to different frames (S1235). If the logical volumes of the pair are to be transferred to different frames, (Y in S1235), a process of transfer to different frames (details are given below) is executed (S1245). If the logical volumes of the pair are not to be transferred to different frames (N in S1235), a process of transferring a logical volume singly is carried out (S1250). If transfer is to be continued when the transfer process is ended (Y in S1255), the procedure returns to S1225. If transfer is not to be carried out (N in S1255), the operations are ended.

[Process in the Case of Elimination of a Unit]

Figure 13:
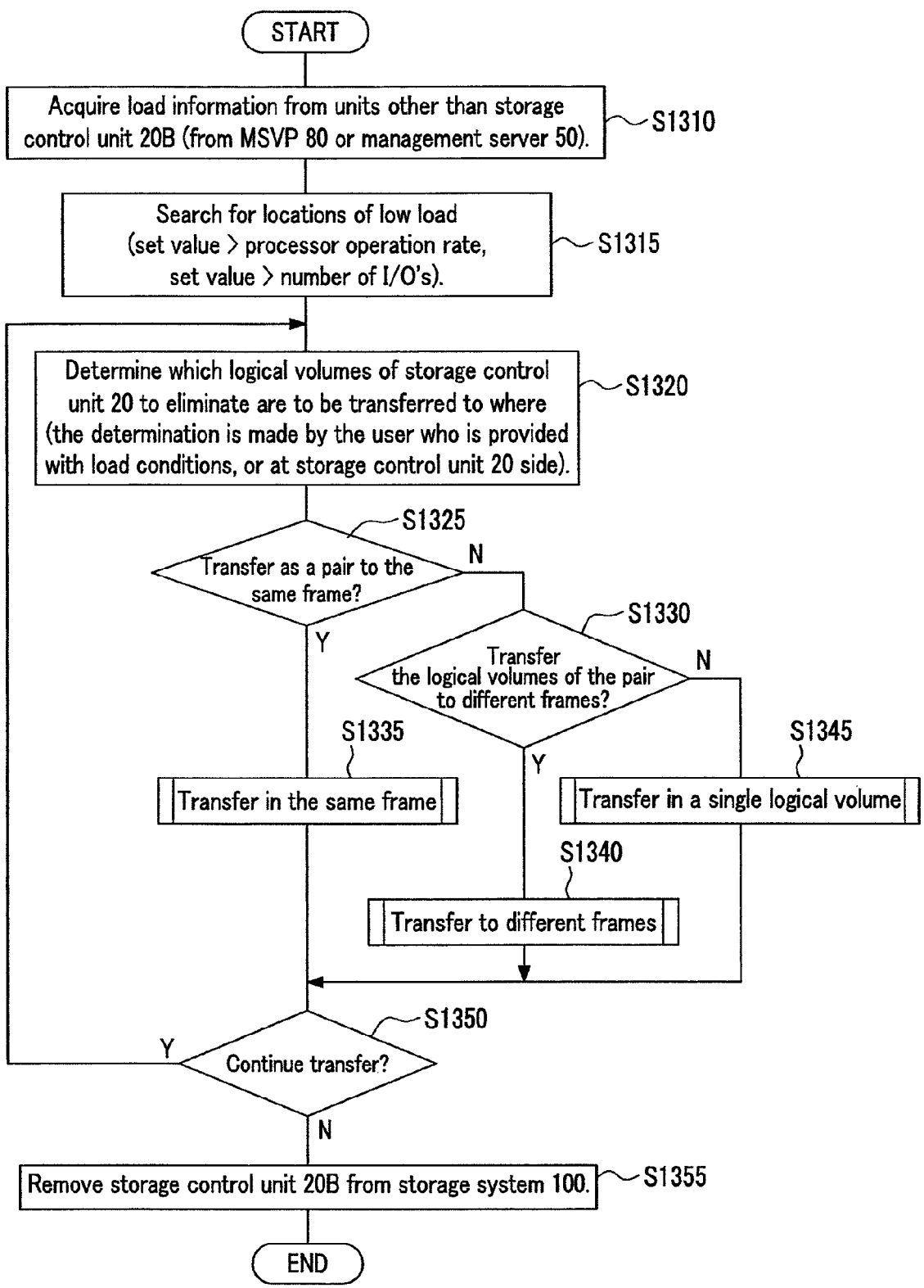
FIG. 13 is a flowchart illustrating a pre-transfer process in case a storage control unit is eliminated.

FIG. 13 is a flowchart illustrating the pre-transfer process in the case that the storage control unit is eliminated. Here, it is assumed that the storage control unit 20B is to be eliminated. As in S1215, load information is acquired from an existing storage control unit other than the storage control unit 20B to be eliminated. The load information is acquired via the MSVP 80 or the management server 50 (S1310). Locations of low load are then searched from the acquired load information (S1315). Specifically, a processor having a, processor operation rate lower than a preset value, or a logical volume for which I/O's are issued more exceedingly than a preset number of I/O's, is searched. A storage control unit 20 having a processor, logical volumes, or other resource of low load is then specified, and then it is determined which logical volumes within this storage control unit are to be subject to transfer. That is, which logical volumes of the storage control unit 20B to be eliminated are to be transferred to where is determined (S1320). Refer to S1225 concerning the specific procedures of the process. The process of S1325 to S1345 is the same as that of S1230 to S1250. If transfer is then to be continued (Y in S1350), the procedure returns to S1320. If transfer is not to be carried out (N in S1350), the storage control unit 20B is removed from the storage system 100 and the process ends (S1355).

[Process in the Case of Load Distribution]

Figure 14:
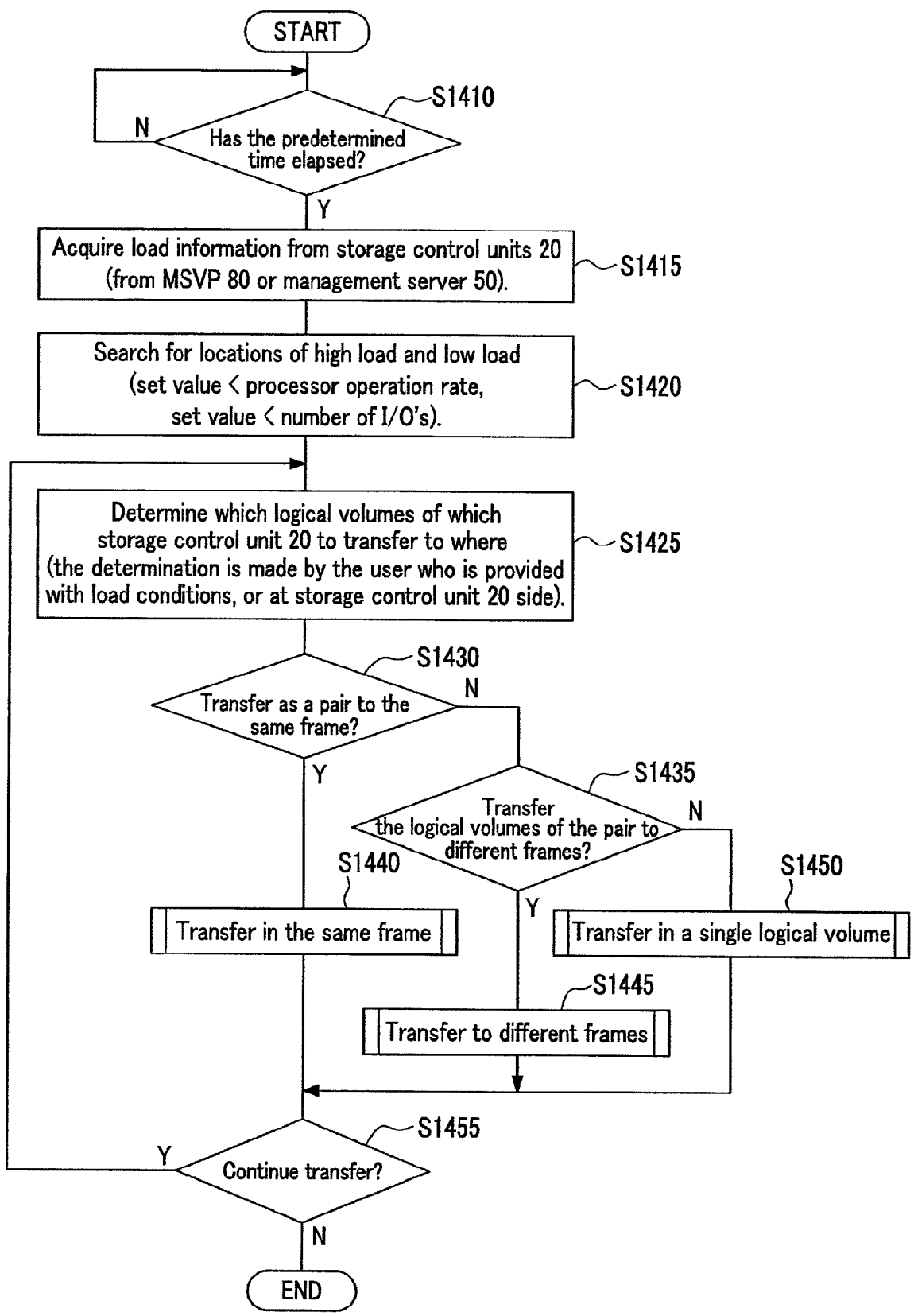
FIG. 14 is a flowchart illustrating a pre-transfer process in case logical volume transfer across a plurality of storage control units is to be performed for the purpose of load distribution.

FIG. 14 is a flowchart illustrating the pre-transfer process in the case of transferring logical volumes between and among a plurality of storage control units for the purpose of load distribution. In order to perform the process at every predetermined time, whether or not the predetermined time has elapsed is judged first (S1410). If the predetermined time has elapsed (Y in S1410), the management server 50 or other SAN management server acquires load information from the storage control units 20. The load information are acquired via the MSVP 80 or the management server 50 (S1415). Locations of high load and low load are then searched from the acquired information (S1420). The specific procedures of the process are the same as those of S1220. It is then determined which logical volumes within the storage control units 20 are to be transferred to where (S1425). The specific procedures of the process are the same as those of S1225. The process of S1430 to S1450 is the same as that of S1230 to S1250. If transfer is then to be continued (Y in S1455), the procedure returns to S1425. If transfer is not to be carried out (N in S1455), the process ends.

The policy for determining which logical volumes are to be transferred to where in S1225, S1320, and S1425 is in accordance with the operation rate of the resource, that is, the CPU operation rate, cache memory usage rate, logical volume usage rate, for example. Also, if it is known in advance that the load will increase only within a specific period as when after creating a replication, a logical volume to be used for a certain purpose is to be stored in the same storage control unit (frame) or is to be deleted after being used for a certain period, such factors may also be taken into consideration in the determination. For example, in order to determine which logical volumes are to be transferred, not only the operation rate of the resource but the attributes of its logical volumes are referenced as well. As a part of an operation, a replication logical volume (secondary logical volume) may be used restrictedly within a predetermined period. In this case, by referencing the attribute of the logical volume, it can be made known in advance that after the elapse of the predetermined period, the replication logical volume will become unnecessary and become (be scheduled to be) deletable. Since it can thus be foreseen that even if the load increases for the predetermined period, the load will be lightened eventually, the judgment of not performing logical volume transfer is also possible.

Also, in a case where logical volumes forming a pair within the same frame at the point of replication creation become a pair across different frames by a logical volume transfer process and then return to being the original pair within the same frame by another logical volume transfer process, LUs and pair information may be newly created or the previous information may be invalidated and then used upon being revalidated in the transfer processes.

<Transfer Timing Arbitration Process>

Figure 11:
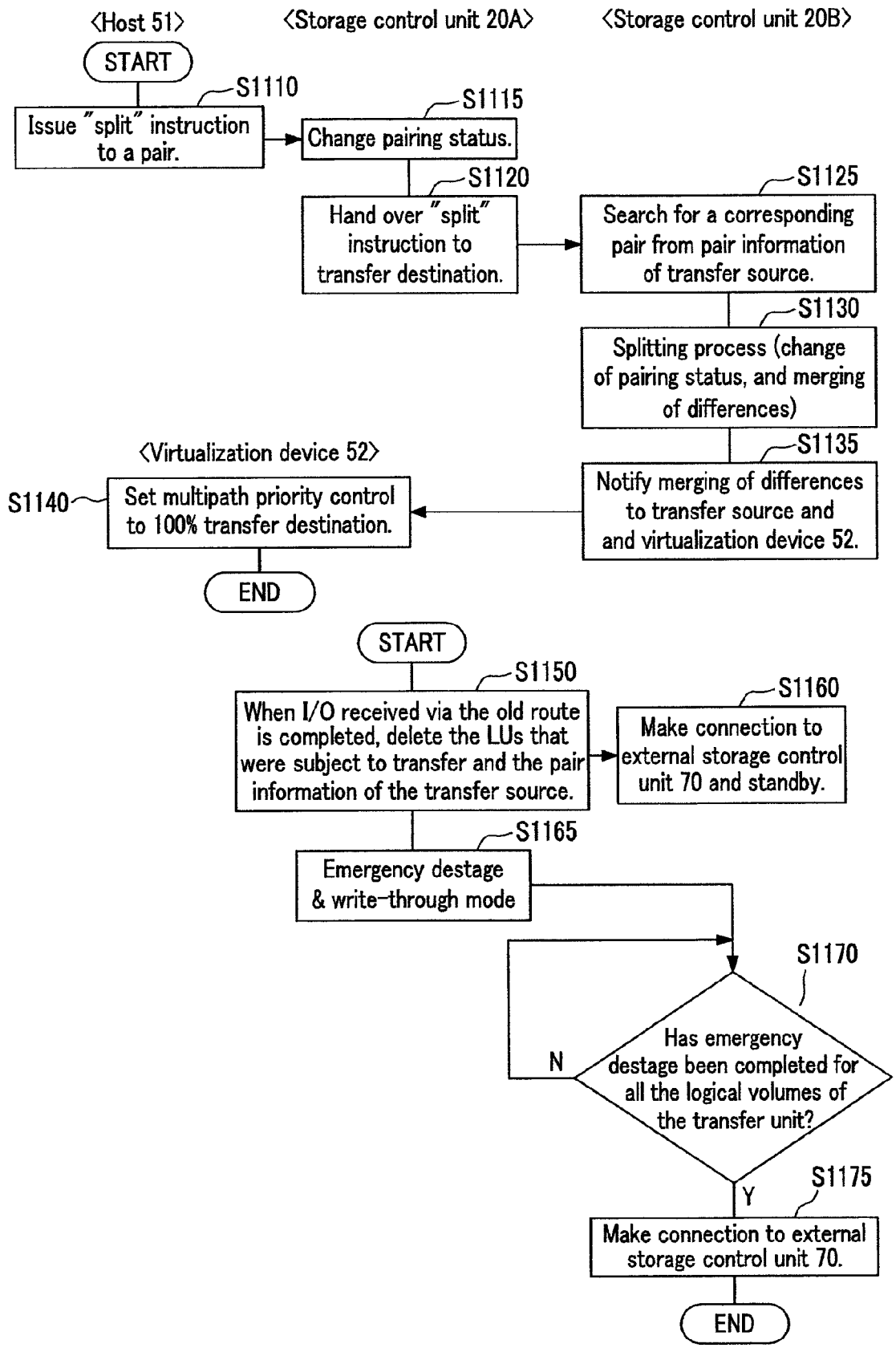
FIG. 11 is a flowchart illustrating a process for starting the transfer of a pair of logical volumes between storage control units.

Though the processes of FIG. 10 and FIG. 11 are examples wherein the timing for transferring logical volumes is arbitrated by communication between storage control units 20A and 20B, this arbitration of timing can be carried out by the management server 50. That is, each time the timing arrives, the management server 50 may notify that to the respective storage control units 20 to make the respective storage control units 20 start the process.

By the foregoing, when a logical volume to be subject to transfer is a logical volume for which a replication is being created, the process of transferring the logical volume can be realized while executing the copy process of the replication with the replication relationship being maintained. Also, with a storage control unit having a plurality of control units to which a plurality of disk devices are connected, copies of storage areas can be prepared without having to be aware of the different control units, not only in the case of creating a replication of a logical volume inside a disk device that is connected to the same control unit but also in the case of creating a replication for a logical volume without a disk device (entity) that is connected to a different control unit.

<<Group Transfer and Pair Splitting>>

Although in the foregoing description, as the logical volumes to be transferred between storage control units, replication logical volumes are handled wherein the entire logical volumes match to each other, the volumes do not necessarily have to be a single pair but a group of two or more pairs may be handled. When the group is handled as the volume to be transferred, all or a portion of the pairs in the group may be transferred.

To one group belong a pair of data such as a table, index, and log relating to a job whose consistency should be maintained to each other. When all data of one group are stored in the storage control unit 20, processes and internal processes for requests from the host 51, for example, may increase the load on the resources (e.g., a port, CPU, cache memory, and hard disc unit). To disperse the load, the log, for example, from the data in the group is transferred to and stored in another storage control unit 20. At this time, by managing those data existing across a plurality of storage control units 20 (log and data other than log) as belonging to a single group, it is allowed to maintain mutual consistency between the data, as well as to ensure synchronicity (and as a result, consistency) in pair splitting.

The processes for forming a group across a plurality of storage control units 20 are twofold. Processes for providing a group of pairs and for transferring the pairs may be performed in any order. One process includes: first setting a group of pairs in one storage control unit 20; and transferring a portion of the pairs to another storage control unit 20. Other process includes: creating a plurality of pairs in one storage control unit 20; transferring a portion of the pairs to another storage control unit 20; and providing as a group those pairs existing across the two storage control units 20.

FIG. 20 is a diagram showing an example of a group information table. The group information table Gt1 is a table for managing correspondence relationships among groups, storage control units and pairs, including group numbers, storage control unit numbers, and pair numbers. The group numbers each have a number unique to a group in the storage system 100 (see FIG. 1). The storage control unit numbers each have a number of the storage control unit managing the pairs belonging to the group. Here, two or more of the storage control unit numbers may correspond to one group number. This means that a pair belonging to the group exists across two or more of the storage control units 20 (frames). The pair numbers are the numbers for the pairs to be managed by the storage control unit, out of the pairs belonging to the group. Information on the primary and secondary volumes corresponding to the pair numbers can be specified by the volume pair information management table Ct1 (see FIG. 6).

As shown in FIG. 20, the group numbered 0, for example, comprises the pairs managed by the storage control units 20A and 20B, specifically the pairs numbered 0 to 6 (in the storage control units 20A) and 6 to 9 (in the storage control units 20B). The group numbered 1 comprises the pairs numbered 11 and 12 in the storage control units 20C. It is to be noted that the pair numbers described herein are exemplary numbers unique to the storage system 100.

The group information table Gt1 is possessed by the management server 50, the host 51, and the virtualization device 52. In this regard, the arrangement relationship between the group information table Gt1 and the exchange path software Mc100 will be considered. If the management server 50 has the group information table Gt1, then the host 51 or the virtualization device 52 has the exchange path software Mc100. If the host 51 has the volume pair information management table Ct1, then the host 51 also has the exchange path software Mc100. Similarly, if the virtualization device 52 has the group information table Gt1, then the virtualization device 52 also has the exchange path software Mc100. The storage control unit 20 may, in some cases, reference or query the content of the group information table Gt1.

Next will be discussed the process for transferring a pair in the group. For example, when the pairs numbered 0 to 6, which are part of the pairs in the group 0, are the transfer object and the storage control unit 20B is the transfer destination, the transfer process for the pairs 0 to 6 is performed with the method described above, the storage control units for the group numbered 0 in the group information table Gt1 are 20A and 20B, and the pair numbers included in the respective units 20A and 20B are registered. The pair been transferred across the storage control units 20 (e.g., transfer for the secondary volume only) is denoted in both pair numbers. This is exemplified as the pair numbered 6 which has a pair between the storage control unit 20A and 20B, as shown in FIG. 20.

As discussed before, a pair may be used in such a manner that a pair which has once obtained consistency as replication logical volumes is split and separately used. Here, the Split request for the group is a request to split the pairs belonging to the group. The request is achieved by publishing an At-Time Split command for each group or to one of the pairs in the group, for example. "At-Time Split" is a function for splitting a plurality of pairs at a predetermined time in a synchronized manner. The At-Time Split command is a command for carrying out the function.

Figure 21A:
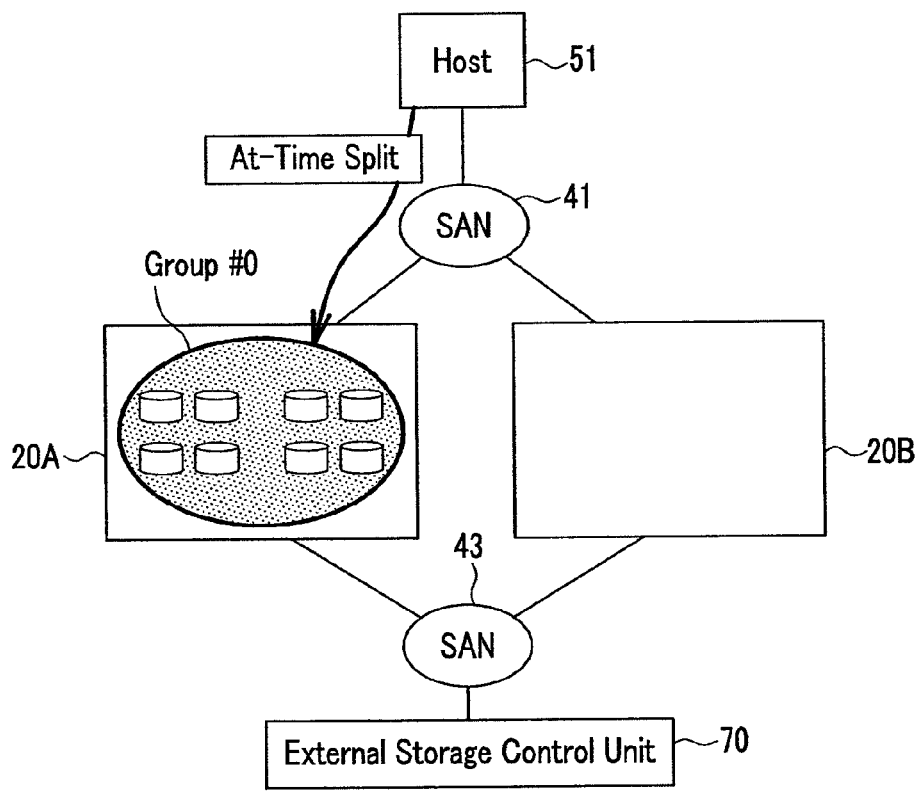
FIG. 21A is a diagram showing a method for performing a Split request from a host when a group is stored in one storage control unit, wherein an At-Time Split command is published to the group.
Figure 21B:
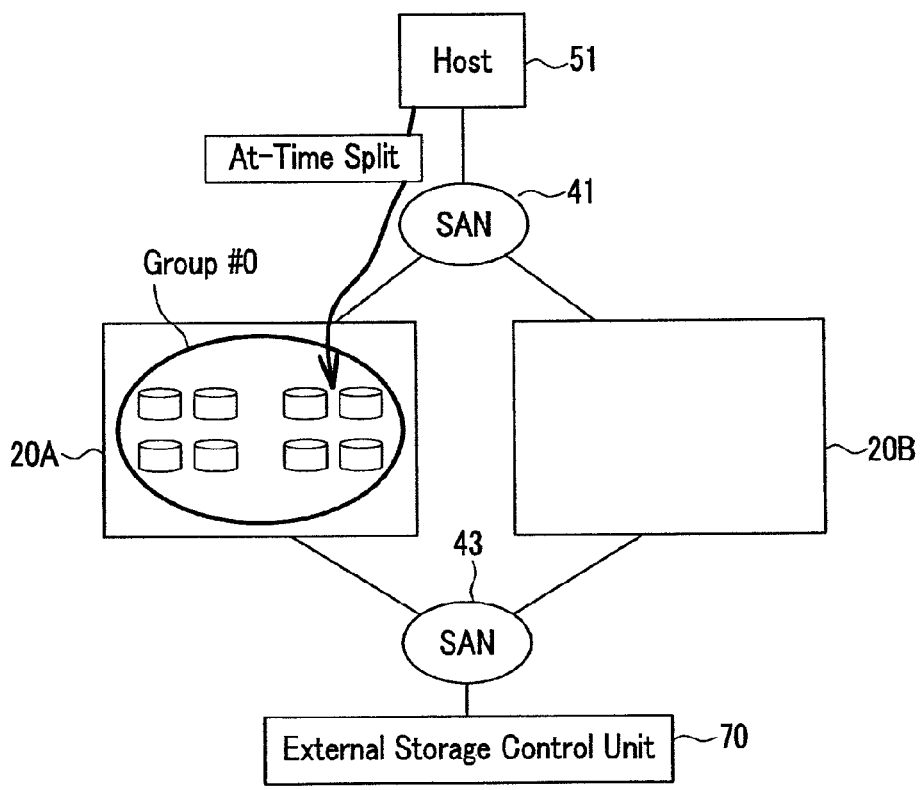
FIG. 21B is a diagram showing a method for performing the Split request from the host when the group is stored in one storage control unit, wherein the At-Time Split command is published to one of the pairs in the group.

FIG. 21A is a diagram showing a method for performing the Split request from the host when the group is stored in a single storage control unit 20A, wherein the At-Time Split command is published to the group. FIG. 21B is a diagram showing the same method, wherein the At-Time Split command is published to one of the pairs in the group.

In FIG. 21A, the storage control unit 20A receives a At-Time Split command for a group and then performs a process for splitting at the same time all pairs belonging to the group. In FIG. 21B in contrast, the storage control unit 20A receives an At-Time Split command for a pair, and if the pair that received the command belongs to a group, then specifies the group and performs the command to split at the same time all the pairs belonging to the group (including the pair which received the command and other pairs).

Figure 22A:
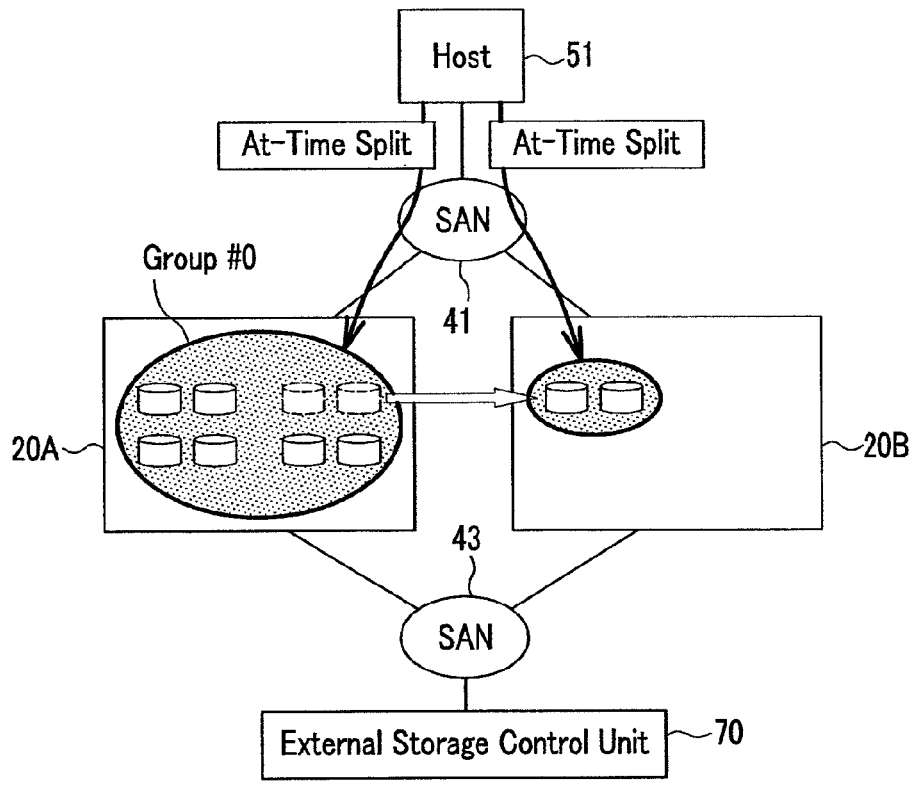
FIG. 22A is a diagram showing a method for performing the Split request from the host to all of a plurality of storage control units when the group exists across the plurality of units, wherein the At-Time Split command is published to the group.
Figure 22B:
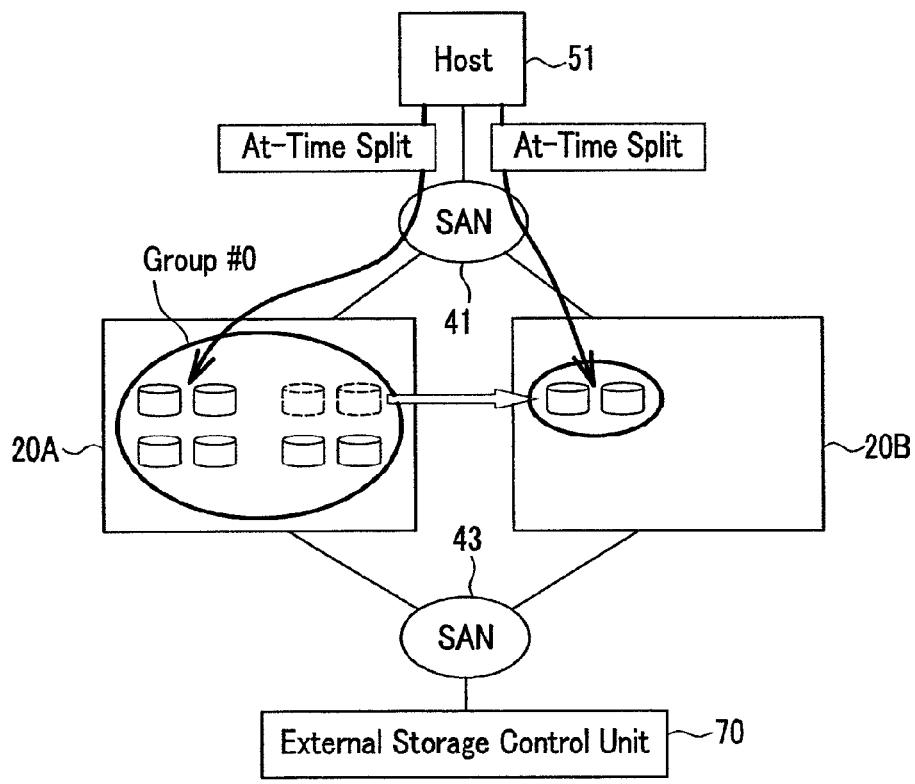
FIG. 22B is a diagram showing a method for performing the Split request from the host to all of a plurality of storage control units when the group exists across the plurality of units, wherein the At-Time Split command is published to one of the pairs in the group.

If the group exists across a plurality of storage control units 20, then the host 51 uses the group information table Gt1 to perform a process to publish the At-Time Split command to all of the storage control units 20 including the group, as exemplarily shown in FIG. 22, as opposed to the host 51 publishing the command to only one storage control unit 20A as shown in FIG. 21. When the group numbered 0 is present across the storage control units 20A and 20B, the host 51 publishes the At-Time Split command for the group 0 to each of the storage control units 20A, 20B so as to perform the process to split at the same time all the pairs belonging to the group 0. FIG. 22A shows a method for publishing the At-Time Split command to the group. FIG. 22B shows a method for publishing the At-Time Split command to one of the pairs in the group.

In FIG. 22A, the host 51 publishes the At-Time Split command to respective object group in the storage control units 20 including the group. In this case, the storage control units 20A, 20B each receive the At-Time Split command for a group, and perform the process for splitting at the same time all the pairs belonging to the group. In FIG. 22B, in contrast, the host 51 publishes the At-Time Split command to one of the pairs in respective object group in all of the storage control units 20 including the group. In this case, the storage control units 20A, 20B each receive an At-Time Split command for a pair, and if the pair that received the command belongs to a group, then specifies the group and performs the process to split at the same time all the pairs belonging to the group. To achieve the Split process in the storage control units 20 at the same time, it is required, for example, that the host 51 preset in the At-Time Split command a time for performing the Split process, and then the storage control units 20A, 20B each perform the Split process at the preset time.

Next will be discussed the processes to be performed when a group exists across the storage control units 20. The processes here range from using the group information table Gt1 to recognize to which storage control units 20 the command is to be published (whether or not to a plurality of storage control units 20), to publishing the command. The processes are considered to be within the range of FIGS. 21A to 22B as mentioned above. The following discussion will be made on the processing steps to be performed when the host 51 includes the group information table Gt1, referring to FIG. 23.

(1) According to an instruction from the host 51 (or MSVP 80, SVP 81 (see FIG. 2)), one of the pairs in the group #0 is transferred from the storage control unit 20 to the storage control unit 20B. The process regarding the pair transfer is conducted as described with the flowchart in FIG. 11.

(2) When the pair transfer is complete, the host 51 updates the group information table Gt1.

(3) The host 51 (or MSVP 80, SVP 81) receives an request from the user to split the entirety of the group #0 (At-Time Split command).

(4) The host 51 retrieves the group information table Gt1 to determine to which storage control unit 20 the At-Time Split command should be published. In this example, the command is published to the storage control units 20A and 20B.

(5) The storage control units 20A, 20B perform at the same time the Split process for all of the pairs in the group #0, according to, for example, the Split processing time preset in the At-Time Split command.

These processes can obtain the consistency as a pair while maintaining the group attribution in the replication logical volume. Specifically, it is allowed to maintain mutual consistency between the data belonging to a group, as well as to ensure synchronicity (and consequently consistency) in pair splitting.

<<Transfer Process for Volume in Virtual Area>>

The aforementioned embodiment discussed a method including obtaining the same capacity as the primary volume in the secondary volume to which the entire data is copied so as to create a pair. Next will be described as another embodiment, a transfer process in the case that, of the replication logical volume pair, the secondary volume is a virtual volume with a virtual area called "pool" (hereinafter referred to as "pool area") only storing data of a location different from the primary volume, without obtaining a data area having the same capacity as the primary volume.

When the secondary volume uses the virtual volume, an address mapping table is used to manage where the data in the respective locations (addresses) in the secondary volume is stored. For a location with the same data as the primary volume, an address in the primary volume is denoted of the location storing the target data. For a location with different data from the primary volume, an address in the pool area storing the data is indicated. The address mapping table exists one for each snap shot generation (pair splitting timing). The pool area exists in the disc device 24 in the storage control unit 20 or in the external storage control unit 70 (see FIG. 1). The address mapping table is in the common memory 22 in the storage control unit 20 or in the external storage control unit 70 (see FIG. 1).

Figures 23, 24:
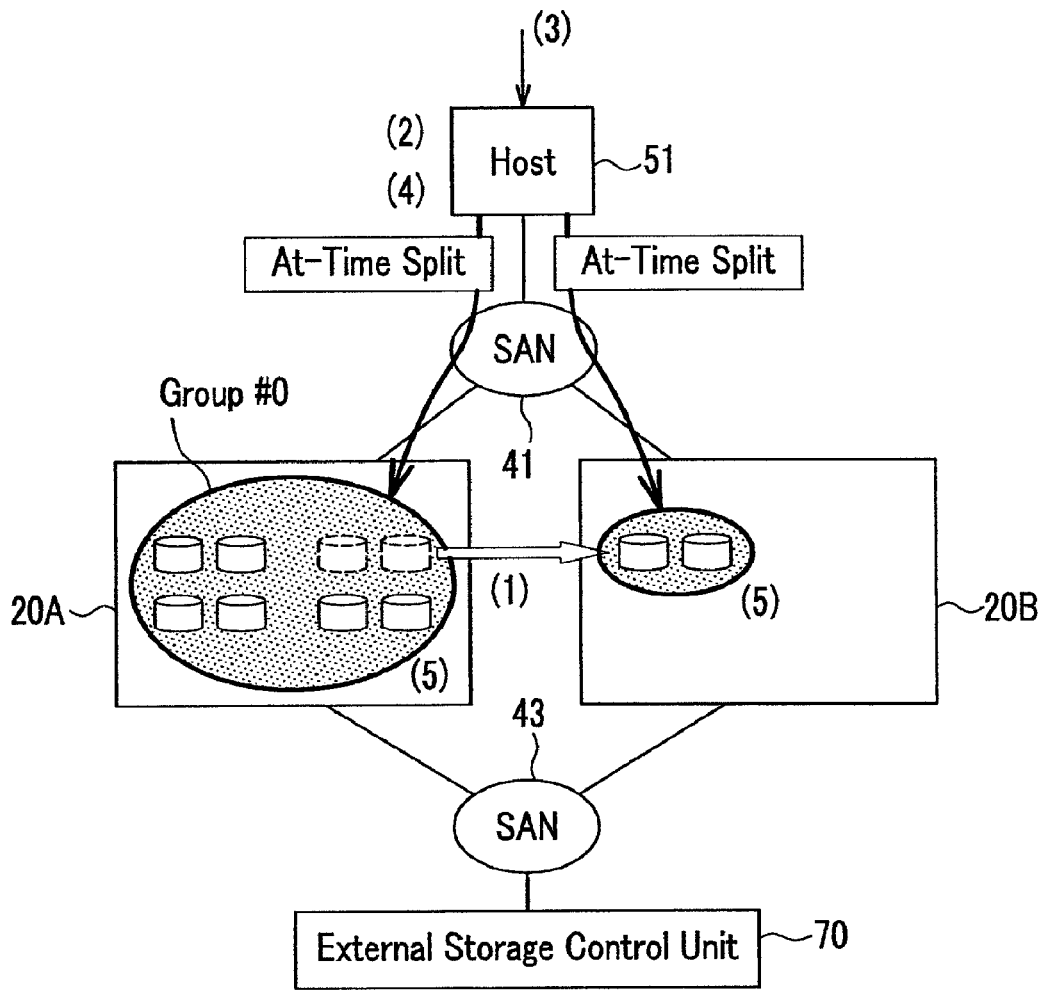
FIG. 23 is a diagram showing transfer and splitting processes for a replication logical volume when the host includes the group information table.
FIG. 24 is a diagram showing an example of the address mapping table.

FIG. 24 is a diagram showing an example of the address mapping table. The address mapping table At1s is a table pertaining to the secondary volume of a given pair, including volume addresses and actual data storage addresses. The volume addresses include all the addresses in one capacity of a volume, which are LBAs (Logical Block Addresses), for example. The actual data storage addresses are the locations each storing, for each volume address thereof, secondary volume data corresponding to the volume address. As shown in FIG. 24, data with volume addresses numbered 0 and 1, for example, are stored in the address 10011 in the pool area and in the same address of the primary volume (P-VOL), respectively. The address mapping table may have other configuration as long as it can manage the addresses storing snap shot data.

The primary volume may also use the virtual volume in some cases. Not only the primary volume but also an ordinary volume with an entity (hereinafter referred to as actual volume) obtains in advance a predetermined capacity of memory. In other words, the data area which exists as an entity with the predetermined capacity of memory, whether or not any data being written therein, may include an unused area (with no written data). To eliminate such unused data area, the pool area is allotted with a memory area with a capacity of the data actually written in the primary volume.

The memory area is managed by using an address mapping table At1p (not shown) in the same format as the address mapping table At1s in FIG. 24. The volume addresses may be prepared for the entire addresses for the primary volume capacity, or may be added by the amount used. The actual data storage addresses are the address in the pool area in which is stored data corresponding to the volume address. When the volume addresses include all the addresses in one capacity of a volume, some volume addresses may be unused thus invalidating the actual data storage addresses thereof. When volume addresses are in use, the actual data storage addresses thereof are all valid. When the primary and secondary volumes are both virtual volumes, the actual data storage addresses are set using the addresses of the pool area, not in the format "P-VOL", as shown in FIG. 24.

<Transfer Process Overview>

Next will be discussed a transfer process in the case that the primary and secondary volumes are the actual and virtual volumes, respectively.

(1) Transferring Only Specific Pair

Figure 25:
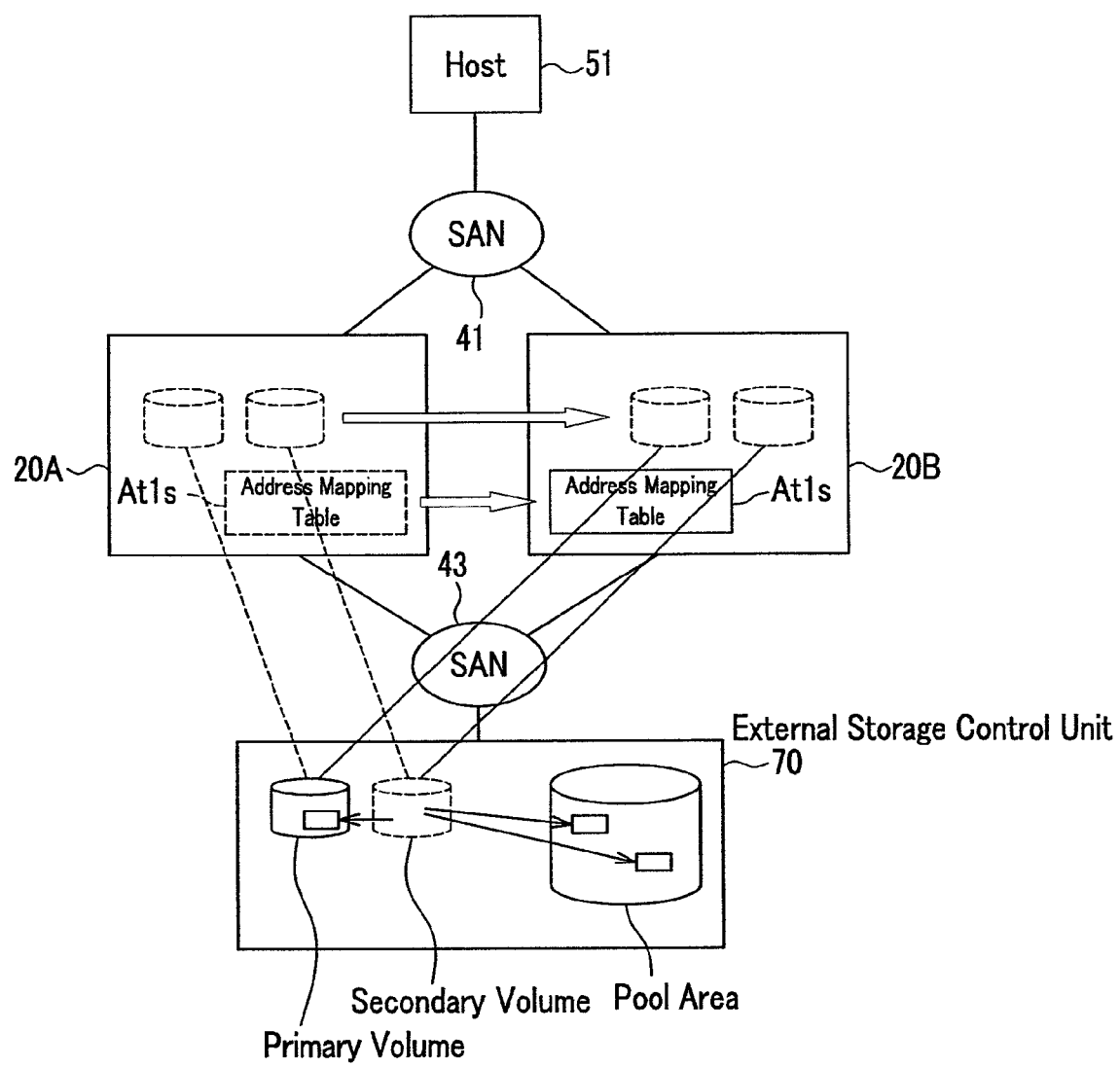
FIG. 25 is a diagram showing a construction to achieve a method for including the primary volume and the pool area in an external storage control unit.

An embodiment for creating a pair using the pool area in the storage system 100 includes a method in which the external storage control unit 70 includes the primary volume and the pool area. FIG. 25 shows a construction for achieving the method. The pair in the storage control unit 20A creates the secondary volume as a virtual volume. To transfer the pair to the storage control unit 20B, a process is performed for switching the primary/secondary volumes between the storage control units 20 (as discussed above), and the address mapping table At1s of the secondary volume is transferred from the storage control unit 20A to the storage control unit 20B. Upon completion of the transfer of the address mapping table At1s from the storage control unit 20, the storage control unit 20B reads out the data in the pool area and starts an I/O process for the primary/secondary volumes.

(2) Transferring the Entire Pool Area

If the volume desired to transfer is provided in a pair and the secondary volume is a virtual volume, then it may be considered to transfer the entire pool area. In this case, a process is performed to transfer all the pairs in the pool area.

Next will be described a transfer process in the case when the primary and secondary volumes are virtual volumes. In this case, the process for the secondary volume is carried out for both the primary and secondary volumes. If the pool area exists in the storage control unit 20, in order to transfer the entire pool area to the storage control unit 20 as the transfer destination, the data and the address mapping tables At1p, At1s in the pool area are copied thereto.

<Variations in Snapshot Transfer>

For a snapshot when the pair includes the virtual volume, there are two virtual volume variations: the primary/secondary volumes being the virtual volumes, and the secondary volume being the virtual volume. Also, there are three variations in the transfer object: the secondary volume, a single pair (primary and secondary volumes), and the entire pool area (the entire pairs in the pool area). Therefore, when the pair includes the virtual volume, the snapshot transfer comes in six (=2×3) varieties. The following discussion is on the processing for each of the varieties, on the assumption that the pool area is stored in the external storage control unit 70. The pool area may be stored in each of the storage control units 20 and transferred therebetween.

[Transferring Secondary Volume When Primary/Secondary Volumes Are Virtual Volumes]

From the storage control unit 20A to 20B, the address mapping table At1s of the secondary volume is transferred. The storage control unit 20B uses the address mapping table At1s transferred from the storage control unit 20A to refer to and update the data in the pool area. Because the primary/secondary volumes are virtual volumes, all data are in the pool area. With regard to the primary volume, the storage control unit 20A comprises the address mapping table At1p for the primary volume. Reference to the primary volume is made from the storage control unit 20B via the SAN 41.

[Transferring a Pair When Primary/Secondary Volumes are Virtual Volumes]

From the storage control unit 20A to 20B, the address mapping tables At1p and At1s of the primary and secondary volumes, respectively, are transferred. The storage control unit 20B uses the address mapping tables At1p, At1s transferred from the storage control unit 20A to refer to and update the data in the pool area. Because the primary/secondary volumes are virtual volumes, all the data are in the pool area.

[Transferring the Entire Pool Area When Primary/Secondary Volumes are Virtual Volumes]

To transfer the entire pairs in the pool area, the address mapping tables relating to the pool area is entirely transferred. The address mapping tables At1p, At1s may be copied from the storage control unit 20A, or from the external storage control unit 70 if the tables are contained therein.

[Transferring Secondary Volume When Secondary Volume is Virtual Volume]

From the storage control units 20A to 20B, the address mapping table At1s of the secondary volume is transferred. Of the secondary volume data, for a location (volume address) where the entity of the data exists in the primary volume, the actual data storage address in the address mapping table At1s is modified so that the storage control unit storing the primary volume and the volume number can be specified. The storage control unit 20B uses the address mapping table At1s transferred from the storage control unit 20A, and if the pool area contains any data, then refers to and updates the data, and if the primary volume contains any data, then refers to and updates the data in the storage control units 20A via SAN 41.

[Transferring a Pair When Secondary Volume is Virtual Volume]

If the entity of the primary volume exists in the external storage control unit 70, then the SAN 43 is reconnected, or if the entity is an internal volume of the storage control unit 20A, then data is copied and transferred via the SAN 41. Next, the address mapping table At1s of the secondary volume is transferred from the storage control unit 20A to 20B. Of the secondary volume data, for a location (volume address) in the primary volume, the information in the address mapping table At1s is used as is. That is, the storage control unit 20B uses the address mapping table At1s transferred from the storage control unit 20A to refer to the secondary volume data. If the pool area or the primary volume includes any data, then the storage control unit 20B refers to and updates the respective data.

[Transferring the Entire Pool Area When Secondary Volume is Virtual Volume]

To transfer the entire pairs in the pool area, the address mapping table relating to the pool area is entirely transferred. The address mapping table At1s may be transferred from the storage control unit 20A. When the address mapping table At1s is in the external storage control unit 70, reference may be made thereto. If the entity of the primary volume is in the external storage control unit 70, then the SAN 43 is reconnected. If the entity is an internal volume of the storage control unit 20A, then data is copied and transferred via the SAN 41. The storage control unit 20B uses the address mapping table At1s transferred from the storage control unit 20A, and if the pool area contains any data, then refers to and updates the data, and if the primary volume contains any data, then refers to and updates the data via SAN 41.

As described above, the transfers between the storage control units 20 can be performed as the replication logical volumes, regardless of whether the primary volume is the virtual volume or both the primary and secondary volumes are the virtual volumes. When the pool area is stored in the external storage control unit 70, in particular, it is not required to transfer the pool area between the storage control units 20 and thus the virtual volume can be transferred quickly.

Though an embodiment of this invention has been described above, the storage system of this invention's embodiment is deemed to be realized by recording the programs executed respectively by the storage system shown in FIG. 1 in a computer-readable recording medium and making a computer system read and execute the programs recorded in this recording medium. The programs may be arranged to be provided to the computer system via a network, such as the internet.

<<Other Embodiments>>

Though an example of a preferred embodiment of this invention was described above, this invention is not restricted thereto but suitable changes may be made within a scope falling within the gist of this invention. For example, the following embodiments are possible.

(1) Though in the above description of the embodiment, replication logical volumes in which the entireties of the logical volumes match to each other were handled as the logical volumes to be subject to transfer between storage control units, logical volumes having the same attribute (for example, a portion of the data in each logical volume) may be handled instead. That is, a logical volume having certain data and a logical volume having a replication of those certain data may be subject to transfer between the storage control units.

(2) When a volume to be transferred between the storage control units belongs to a group comprising two or more pairs, the data content does not necessarily have to match to each other, and the pairs or group may match in data attribute (for example, a partial range of the data). The same applies to the portion of the data in each logical volume of (1).

(3) Though in the embodiment described above, both the primary and secondary replication logical volumes exist in an external storage control unit 70, other logical volume configurations are also possible. For example, a configuration wherein both replication logical volumes exist in a storage control unit 20 is possible. Also, a configuration is possible wherein one of the replication logical volumes exists in the storage control unit 20 and the other exists in the external storage control unit 70.

In such a case where at least one of the replication logical volumes exists inside the storage control unit 20 (is an internal logical volume), when the emergency destage of the internal logical volume of S1165 of FIG. 11 ends, data transfer of the internal logical volume is started. Here, data transfer refers to the transferring of data from the transfer source storage control unit 20A to a transfer destination storage control unit 20B via a SAN 41. During the data transfer, to which position of the internal logical volume the data transfer has ended is managed at the storage control unit 20A by means of data transfer end position information. When a new I/O is received at the storage control unit 20B side, the data transfer end position information of the storage control unit 20A side is referenced, and if the data transfer of the subject of the I/O request has ended, the storage control unit 20B writes the data into the logical volume that is being transferred or has been transferred to the unit itself. If the data transfer has not ended, the data transfer is carried out after writing into the logical volume of the storage control unit 20A or the data subject to the I/O request is first transferred to the storage control unit 20B and writing is performed thereafter.

By the above, not only replication logical volumes but a pair or a group of logical volumes with any of the abovementioned relationships can be subject to transfer between and among storage control units. A storage system can thereby be put in operation more flexibly accordance to the increase, decrease, or load distribution of storage control units.

(4) While the abovementioned embodiments have respectively described processes for a group across a plurality of storage control units 20, and for when both the primary/ secondary volumes are or the secondary volume is the virtual volume(s), the processes provide setting methods for independent volumes and may be applied to two or more replication logical volumes at the same time.

What is claimed is:

1. A networking storage system comprising:
a computer; and
a storage system comprising:
   a plurality of storage control units;
   a first storage control unit of the plurality of storage control units including a first volume, coupled to the computer, the first volume being provided to the computer;
   a second storage control unit of the plurality of storage control units including a second volume, coupled to the computer, the second volume being provided to the computer;
a third storage control unit of the plurality of storage control units including a third volume, coupled to the first control unit and the second control unit, the third volume storing data which is sent from the first control unit or the second control unit, wherein the third volume of the third storage control unit is a pool area, and wherein if a primary volume of the first storage control unit is an actual volume and a secondary volume of the first storage control unit is a virtual volume and a pair of the primary volume and the secondary volume is transferred to the second storage control unit, then:
a storage area network is connected in a case where an entity of the primary volume exists in the third storage control unit;
the primary volume is copied and transferred via the storage area network in a case where entity of the primary volume exists in the first storage control unit;
an address mapping table of the secondary volume is transferred to the second storage control unit; and
the second storage control unit updates data in the pool area and data of the actual volume by referring to the address mapping table.

2. A networking storage system comprising:
a computer; and
a storage system comprising:
   a plurality of storage control units;
   a first storage control unit of the plurality of storage control units including a first volume, coupled to the computer, the first volume being provided to the computer;
   a second storage control unit of the plurality of storage control units including a second volume, coupled to the computer, the second volume being provided to the computer;
a third storage control unit of the plurality of storage control units including a third volume, coupled to the first control unit and the second control unit, the third volume storing data which is sent from the first control unit or the second control unit, wherein the third volume of the third storage control unit is a pool area, and wherein if a primary volume of the first storage control unit is an actual volume and a secondary volume of the first storage control unit is a virtual volume and an entire pool area is transferred to the second storage control unit, then:
an address mapping table relating to the pool area is entirely transferred;
a storage area network is connected in a case where an entity of the primary volume exists in the third storage control unit;
the primary volume is copied and transferred via the storage area network in a case where entity of the primary volume exists in the first storage control unit; and
the second storage control unit updates data in the pool area and data of the actual volume by referring to the address mapping table.

3. A data volume migration method with a storage system comprising:
an external storage device including a plurality of external physical storage devices which are providing an pool area;
a first storage device coupled to the external storage device, and providing a first logical volume by a plurality of internal physical storage devices and a first virtual volume to a computer;
a second storage device coupled to the external storage device,
   wherein the first logical volume and the first virtual volume are in a pair status, and a virtual storage area in the first virtual volume mapped to the corresponding storage area in the first logical volume if the same data with the first logical volume is stored, or mapped to the pool area in the external storage device if corresponding storage area in the first logical volume stores different data,
   wherein the data volume migration method to migrate first logical volume and the first virtual volume from the first storage device to the second storage device comprising:
      migrate a mapping information from the first storage device to the second storage device, wherein the mapping information indicates each of the virtual storage area in the first virtual storage volume is mapped to either the corresponding storage area in the first logical volume or the pool area in the external storage device,
      update the migrated mapping information so as to indicate a storage area in the migrate first logical volume instead of the storage area in the first logical volume in the first storage device,
      process an access request to the migrated first virtual volume from the computer by the second storage device by referring to the updated mapping information.

4. The data volume migration method according to claim 3, wherein the data migration method to migrate first virtual volume from the first storage device to the second storage device without migrating the first logical volume comprising:
   migrate the mapping information from the first storage device to the second storage device, wherein the mapping information indicates each of the virtual storage area in the first virtual storage volume is mapped to either the corresponding storage area in the first logical volume or the pool area in the external storage device,
   update the migrated mapping information so as to still indicate a storage area in the first logical volume,
   process an access request to the migrated first virtual volume from the computer by the second storage device by referring to the updated mapping information.

5. The data volume migration method according to claim 3, wherein the first storage device further comprising a cache memory for temporarily storing data, wherein the step of migrating data stored in the first logical volume to the second logical volume is executed after de-staging data stored in the cache memory to a physical storage area related to the first logical volume.

6. The data volume migration method according to claim 3, further comprising:
   managing which data is migrated from the first logical volume to the second logical volume, wherein the step of processing access request to the migrated first virtual volume, if a data requested is not migrated to the second storage system, process the request after the requested data is migrated to the second storage system.

7. The data volume migration method according to claim 3, further comprising:
managing which data is migrated from the first logical volume to the second logical volume, wherein the step of processing access request to the migrated first virtual volume, if a data requested is not migrated to the second storage system, process the request to the first logical volume in the first storage device before the requested data is migrated to the second storage system.

* * * * *